United States Patent
Takata et al.

(10) Patent No.: US 11,028,695 B2
(45) Date of Patent: Jun. 8, 2021

(54) STEAM TURBINE

(71) Applicant: Mitsubishi Hitachi Power Systems, Ltd., Yokohama (JP)

(72) Inventors: Ryo Takata, Tokyo (JP); Soichiro Tabata, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 69 days.

(21) Appl. No.: 16/462,651

(22) PCT Filed: Dec. 19, 2017

(86) PCT No.: PCT/JP2017/045430
§ 371 (c)(1),
(2) Date: May 21, 2019

(87) PCT Pub. No.: WO2018/135212
PCT Pub. Date: Jul. 26, 2018

(65) Prior Publication Data
US 2020/0063561 A1 Feb. 27, 2020

(30) Foreign Application Priority Data

Jan. 20, 2017 (JP) .............................. JP2017-008446

(51) Int. Cl.
*F01D 1/10* (2006.01)
*F01D 1/04* (2006.01)

(52) U.S. Cl.
CPC ................. *F01D 1/10* (2013.01); *F01D 1/04* (2013.01); *F05D 2220/31* (2013.01); *F05D 2240/12* (2013.01)

(58) Field of Classification Search
CPC ..... F01D 1/04; F01D 1/10; F01D 5/02; F01D 9/02; F01D 11/00; F01D 25/00;
(Continued)

(56) References Cited

U.S. PATENT DOCUMENTS 2,111,878 A * 3/1938 Van Tongeren ........ F01D 25/32
415/169.4
2,291,828 A * 8/1942 New ....................... F01D 5/145
415/115
(Continued)

FOREIGN PATENT DOCUMENTS

JP S50-001646 B1 1/1975
JP S54-058105 A 5/1979
(Continued)

OTHER PUBLICATIONS

International Search Report dated Mar. 27, 2018, issued in counterpart application No. PCT/JP2017/045430, with English translation. (13 pages).
(Continued)

*Primary Examiner* — Igor Kershteyn
(74) *Attorney, Agent, or Firm* — Westerman, Hattori, Daniels & Adrian, LLP

(57) ABSTRACT

A steam turbine according to an embodiment of the present invention includes: a rotor configured to rotate about an axis; a casing which houses the rotor; and a first stage including a first-stage stationary vane fixed to an inner wall portion of the casing and a first-stage rotor blade fixed to the rotor at downstream of the first-stage stationary vane. The rotor includes a first cavity having a concave shape and being formed on a portion facing the first-stage stationary vane, the first cavity being in communication with an inner space defined between the inner wall portion and the rotor at upstream of the first-stage stationary vane. The first-stage stationary vane includes a first-stage through hole which is in communication with the first cavity and which is formed through the first-stage stationary vane in a radial direction.

18 Claims, 13 Drawing Sheets

(58) Field of Classification Search
CPC ..... F01D 25/32; F16J 15/447; F05D 2220/31; F05D 2240/12
See application file for complete search history.

(56) References Cited

U.S. PATENT DOCUMENTS

| | | | | |
|---|---|---|---|---|
| 2,332,322 | A * | 10/1943 | Kraft | F01D 5/145 |
| | | | | 415/115 |
| 2,399,009 | A * | 4/1946 | Doran | F01D 25/32 |
| | | | | 415/169.3 |
| 3,301,529 | A * | 1/1967 | Wood | F01D 25/32 |
| | | | | 415/169.3 |
| 3,697,191 | A * | 10/1972 | Heymann | F01D 25/32 |
| | | | | 415/169.3 |
| 3,724,967 | A * | 4/1973 | Fischer | F01D 25/32 |
| | | | | 415/169.3 |
| 3,746,462 | A | 7/1973 | Fukuda | |
| 3,923,415 | A * | 12/1975 | Benedict | F01D 25/32 |
| | | | | 415/1 |
| 5,112,187 | A * | 5/1992 | Davids | F01D 5/145 |
| | | | | 415/169.3 |
| 8,979,480 | B2 * | 3/2015 | Inomata | F01D 11/001 |
| | | | | 415/115 |
| 2010/0329847 | A1 | 12/2010 | Yamashita et al. | |
| 2012/0251304 | A1 | 10/2012 | Maruyama | |

FOREIGN PATENT DOCUMENTS

| | | |
|---|---|---|
| JP | S55-040237 A | 3/1980 |
| JP | S58-155204 A | 9/1983 |
| JP | H10-103008 A | 4/1998 |
| JP | 2008-133825 A | 6/2008 |
| JP | 5055451 B1 | 10/2012 |
| JP | 2014-040803 | 3/2014 |

OTHER PUBLICATIONS

Notification of Transmittal of Translation of the International Preliminary Report on Patentability (Form PCT/IB/338) issued in counterpart International Application No. PCT/JP2017/045430 dated Aug. 1, 2019 with Forms PCT/IB/326 PCT/IB/373 and PCT/ISA/237, with English translation. (17 pages).

Office Action dated Apr. 21, 2020, issued in counterpart JP Application No. 2017-008446, with English translation (10 pages).

Office Action dated Aug. 10, 2020, issued in counterpart KR Application No. 10-2019-7016822, with English translation (8 pages).

* cited by examiner

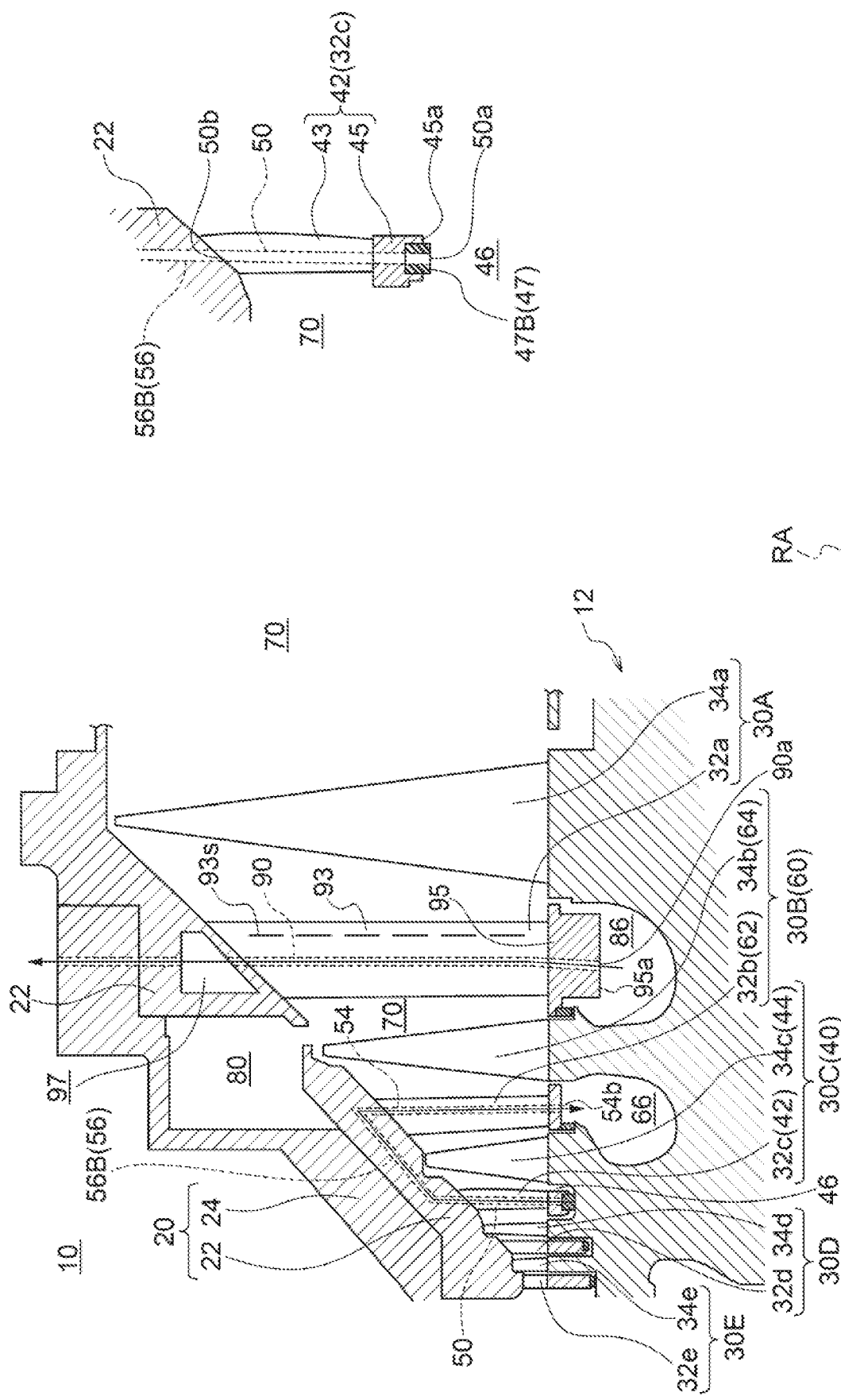

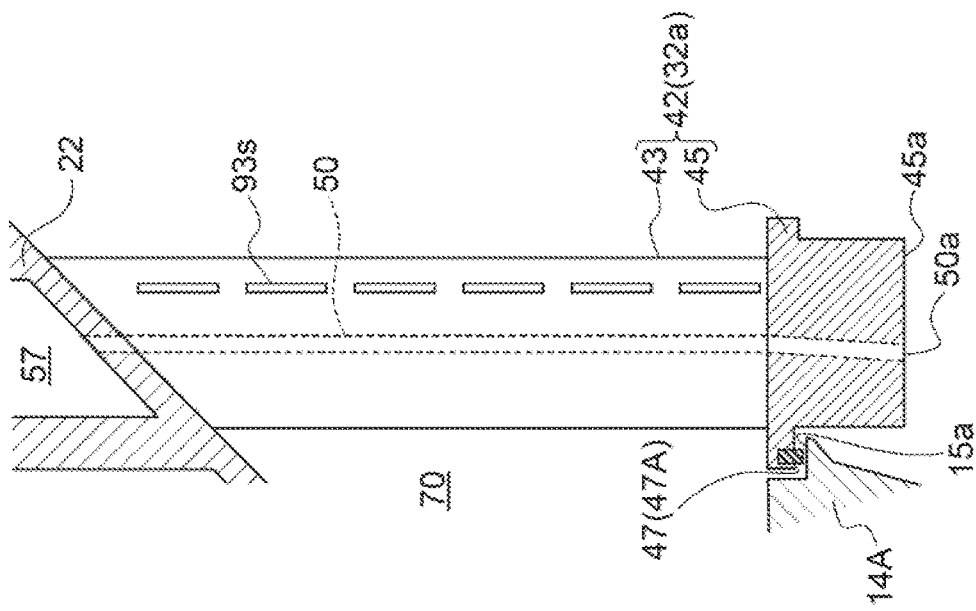
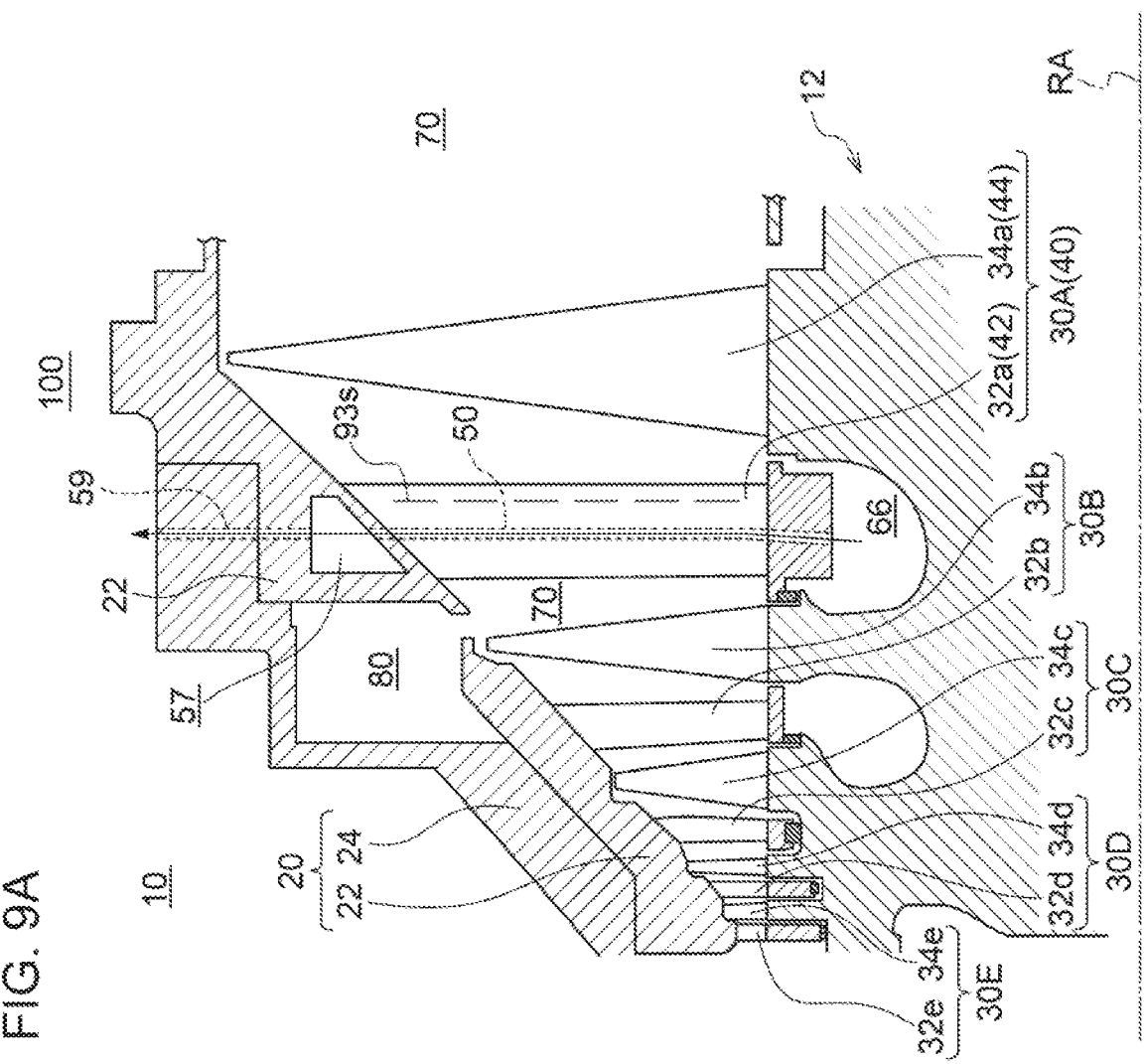

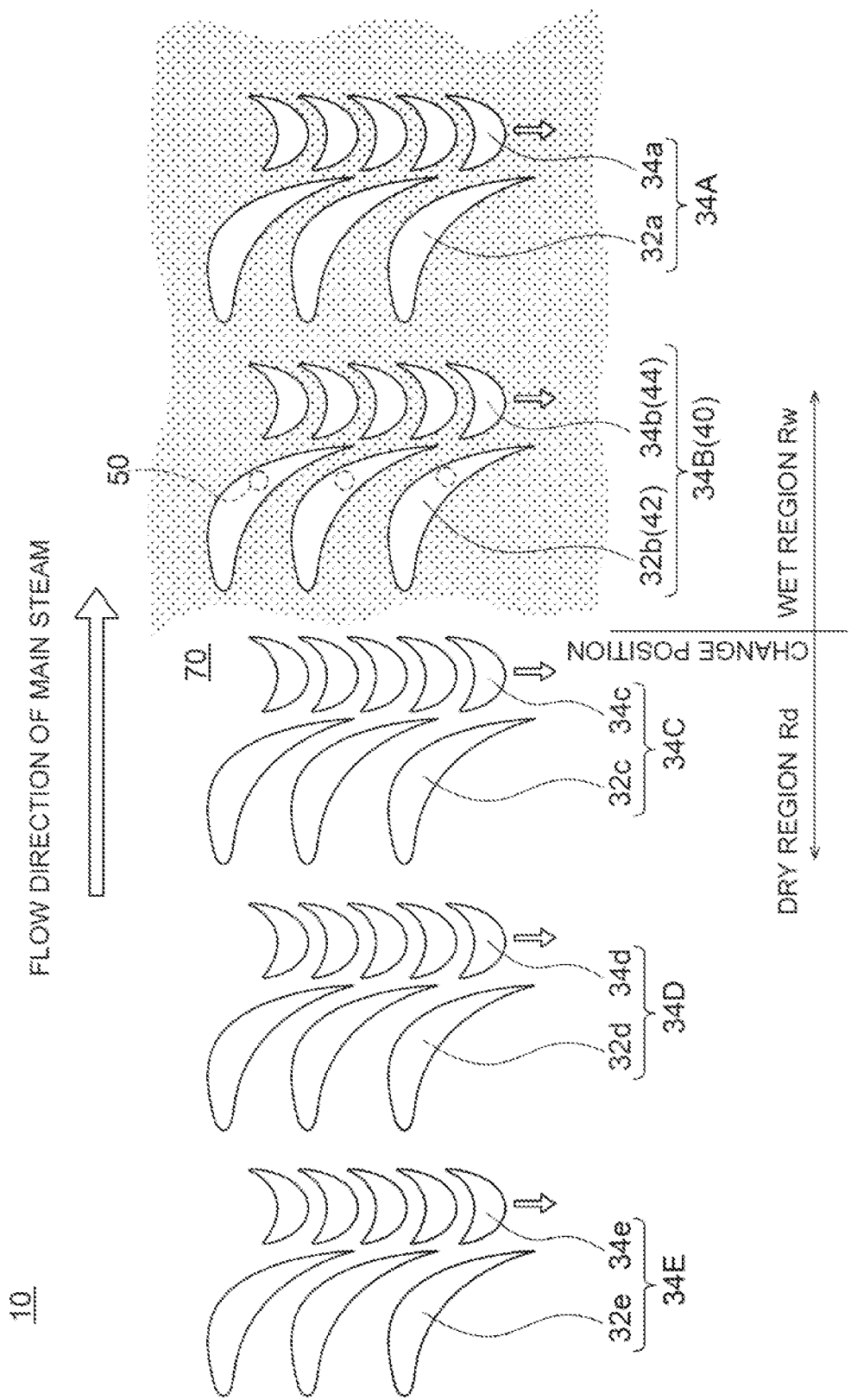

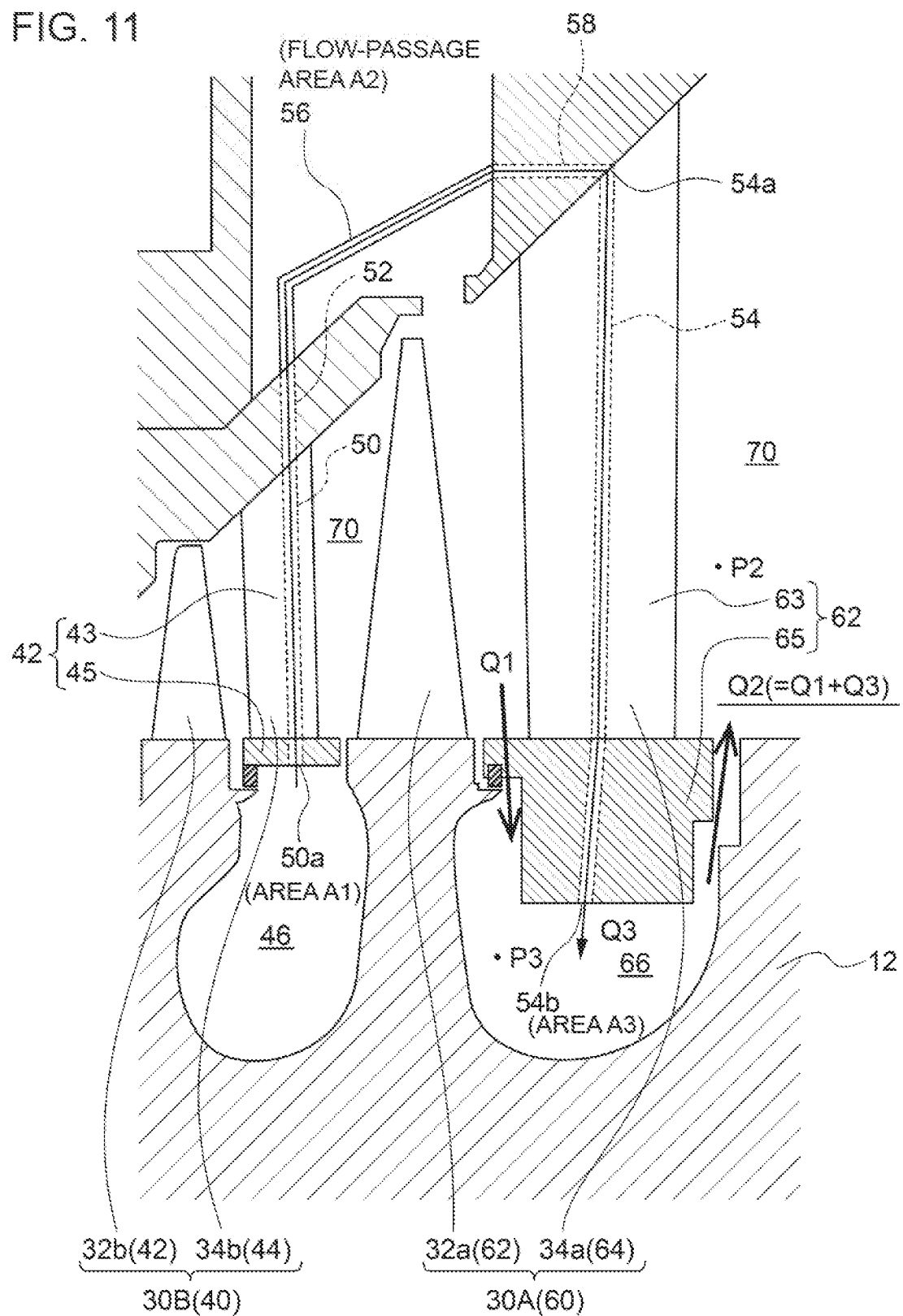

STEAM TURBINE

TECHNICAL FIELD

The present disclose relates to a steam turbine. More specifically, the present disclosure relates to a technique to prevent moisture loss and erosion in a steam turbine driven under the wet region condition.

BACKGROUND ART

For instance, as generally known, in a steam turbine used in a thermal power plant or the like, thermal energy of high-temperature and high-pressure main steam introduced into the steam turbine is converted into rotational energy of a rotor, and thereby the temperature and the pressure of the main steam decrease, thus entering the wet region in the vicinity of the final stage of a low-pressure turbine. Under the wet region condition, liquid drops are produced under the super-cooled state (supersaturated state), and development of these liquid drops may cause moisture loss and erosion.

To prevent moisture loss and erosion due to generation of liquid drops, hollow-sectional stationary vanes having a cavity portion are used as the stationary vanes of the final stage, and a slit being in communication with the cavity portion is formed on the surface of each stationary vane, so as to remove liquid drops that run along the surface of each stationary vane.

Furthermore, besides the above described method, there is a technique to heat the final-stage stationary vanes to remove liquid drops that condense on the surfaces of the stationary vanes. For instance, Patent Document 1 discloses an invention that introduces high-temperature and low-pressure leak steam extracted from a shaft-seal packing before the high-pressure stage of a steam turbine into the final-stage stationary vanes so as to evaporate liquid drops that run along the surfaces of the final-stage stationary vanes.

CITATION LIST

Patent Literature

Patent Document 1: JPH10-103008A

SUMMARY

Problems to be Solved

Meanwhile, to heat the final-stage stationary vanes with leak steam extracted from the shaft-seal packing before the high-pressure stage as in the invention disclosed in Patent Document 1, it is necessary to provide a supply line for supplying the leak steam and a control valve that controls the flow rate of the leak steam, which may cause the structure of the steam turbine to become complex. Further, a great amount of heat is required to evaporate liquid drops, and thus it is necessary to introduce high-temperature steam before the high-pressure stage. Further, extracting leak steam from the shaft-seal packing increases the amount of steam that leaks before the high-pressure stage, and thus the efficiency of the entire steam turbine decreases.

Further, the present inventors conducted intensive researches and found that large liquid drops having a particle diameter of several tens of μm to several hundred μm that cause moisture loss and erosion are generated by condensation of liquid drops on the surface of the stationary vanes. That is, in the wet region, a large amount of fine liquid drops having a particle diameter of 1 μm or less are generated in the steam, and liquid drops also condensate on a part of the surfaces of the stationary vanes where the temperature is lower than the main steam. The condensed liquid drops develop while running on the surfaces of, the stationary vanes, become large liquid drops that have a particle diameter of several tens of μm to several hundred μm, scatter from the trailing edges, and collide with the leading edges of the rotor blades. Further, in a case where stages that enter the wet region is upstream of the final stage, large liquid drops generated in the stage upstream of the final stage repeatedly adhere to the stationary vanes and collide with the rotor blades in the downstream stages. Meanwhile, most of the large amount of fine liquid drops having a particle diameter of 1 μm or less generated in the steam keep flowing along the flow of steam without adhering to the stationary vanes.

That is, in the stage upstream of the wet region, by suppressing the amount of liquid drops that condensate on the surfaces of the stationary vanes, it is possible to effectively prevent collision of large liquid drops with the rotor blades positioned downstream of the final-stage stationary vanes, without evaporating liquid drops that flow along the surfaces of the stationary vanes of the final stage as in the invention disclosed in Patent Document 1.

The present invention was made under the above described background art, and an object of the present invention is to provide a steam turbine whereby it is possible to prevent moisture loss and erosion through a simple structure.

Solution to the Problems (1) According to at least one embodiment of the present invention, a steam turbine includes: a rotor configured to rotate about an axis; a casing which houses the rotor; and a first stage including a first-stage stationary vane fixed to an inner wall portion of the casing and a first-stage rotor blade fixed to the rotor at downstream of the first-stage stationary vane. The rotor includes a first cavity having a concave shape and being formed on a portion facing the first-stage stationary vane, the first cavity being in communication with an inner space defined between the inner wall portion and the rotor at the upstream of the first-stage stationary vane. The first-stage stationary vane includes a first-stage through hole which is in communication with the first cavity and which is formed through the first-stage stationary vane in a radial direction. The steam turbine is configured such that steam introduced from the first cavity via an inlet opening of the first-stage through hole flows through the first-stage through hole.

In the steam turbine described in the above (1), the first-stage stationary vane is configured such that steam introduced from the first cavity via the inlet opening flows through the first-stage through hole. The first cavity is in communication with the inner space at the upstream side of the first-stage stationary vane, and thus steam introduced into the first-stage through hole has a higher temperature than the temperature of main steam that has expanded after passing through the first-stage stationary vane. The temperature of steam introduced into the first-stage through hole is higher than the temperature of main steam that has expanded after passing through the first-stage stationary vane by approximately 10-30° C. The temperature of the steam is not high enough to evaporate liquid drops adhering to the surface of the first-stage stationary vane, but is high enough to prevent condensation of liquid drops on the surface of the first-stage stationary vane.

Thus, according to this embodiment, through a simple structure where the first-stage through hole is merely formed through the first-stage stationary vane in the radial direction, the first-stage stationary vane is heated and the amount of liquid drops that condensate on the surface of the first-stage stationary vane is reduced, and thereby it is possible to prevent occurrence of moisture loss and erosion in the region downstream of the first-stage stationary vane.

(2) In some embodiments, in the above steam turbine (1), the first stage is positioned upstream of a final stage of the steam turbine.

According to the above embodiment (2), by reducing the amount of liquid drops that condensate on the surface of the first-stage stationary vane, it is possible to prevent occurrence of moisture loss and erosion in the final stage in the region downstream of the first-stage stationary vane.

(3) In some embodiments, in the above steam turbine (1) or (2), the first stage is positioned in a wet region which is a region downstream of a change position where main steam flowing through the inner space changes from dry steam to wet steam, the first stage being a most upstream stage in the wet region in a case where a plurality of stages are disposed in the wet region.

According to the above embodiment (3), by reducing the amount of liquid drops that condensate on the surface of the first-stage stationary vane, it is possible to prevent occurrence of moisture loss and erosion in the region downstream of the first-stage stationary vane.

Further, in the present embodiment, dry region refers to a region where main steam flowing therein has a wetness lower than a predetermined wetness (e.g. 3-4%), and wet region refers to a region where main stream flowing therein has a predetermined wetness (e.g. 3-4%) or above.

(4) In some embodiments, in the steam turbine according to any one of the above (1) to (3), the first-stage stationary vane includes a stationary-vane body portion extending from the inner wall portion toward the rotor, and a partition plate having an annular shape and being disposed on a tip portion of the stationary-vane body portion, and the inlet opening is formed on the partition plate.

A common stationary vane includes an annular partition plate that divides an inner space through which main steam flows from a cavity being a concave space formed on the rotor, on the tip end portion of the stationary vane body portion. Thus, according to the above embodiment (4), with the inlet opening formed on the partition plate of the first-stage stationary vane, it is possible to introduce steam from the first cavity into the first-stage through hole via the inlet opening.

(5) In some embodiments, in the above steam turbine (4), the partition plate includes a first seal portion configured to seal a gap between the partition plate and the rotor, and the inlet opening is formed downstream of the first seal portion, or on a position overlapping with a region where the first seal portion is formed in an axial direction of the rotor.

In the steam turbine, a seal portion (first seal portion) that seals the gap between the partition plate and the rotor may be formed, to prevent leakage of main steam flowing through the inner space to the cavity. Thus, according to the above embodiment (5), leak steam after passing through a part of the first seal portion is introduced into the first-stage through hole, and thus it is possible to heat the first-stage stationary vane while preventing a great amount of leak steam from flowing into the first-stage through hole.

(6) In some embodiments, in the above steam turbine (5), the partition plate further includes a second seal portion configured to seal a gap between the partition plate and the rotor, at downstream of the first seal portion. The inlet opening is formed upstream of the second seal portion, or on a position overlapping with a region where the second seal portion is formed in an axial direction of the rotor.

According to the above embodiment (6), by forming the second seal portion in addition to the above described first seal portion, it is possible to reduce the amount of main steam that leaks to the downstream side of the first-stage stationary vane via the first cavity from the inner space.

(7) In some embodiments, in the above steam turbine according to any one of the above (1) to (6), the casing further includes an outer wall portion defining an outer space formed on a radially outer side of the inner space, between the outer wall portion and the inner wall portion. The outer space is formed on a position overlapping with a region where the first-stage stationary vane is formed in an axial direction of the rotor, the outer space being in communication with the inner space at downstream of the first-stage stationary vane. The steam turbine is configured such that steam after flowing through the first-stage through hole is discharged to the outer space from an outlet opening of the first-stage through hole.

In the steam turbine, an outer space may be formed on the radially outer side of the inner space. Thus, according to the above embodiment (7), by discharging steam after flowing through the first-stage through hole to the outer space from the outlet opening of the first-stage through hole, it is possible to introduce steam continuously from the first cavity to the first-stage through hole.

(8) In some embodiments, in the steam turbine according to any one of the above (1) to (6), the steam turbine further includes a second stage including a second-stage stationary vane fixed to the inner wall portion and a second-stage rotor blade fixed to the rotor at downstream of the second-stage stationary vane, the second stage being positioned downstream of the first stage. The rotor is a second cavity having a concave shape and being formed on a portion facing the second-stage stationary vane, the second cavity being in communication with the inner space at upstream of the second-stage stationary vane. The second-stage stationary vane has a second-stage through hole being in communication with the second cavity and being formed through the second-stage stationary vane in the radial direction. The steam turbine further includes a connection passage connecting the first-stage through hole and the second-stage through hole. The steam turbine is configured such that the steam after flowing through the first-stage through hole is discharged to the second cavity from an outlet opening of the second-stage through hole via the connection passage and the second-stage through hole.

The temperature of steam after heating the first-stage stationary vane is higher than the temperature of main steam having performed work on the first-stage rotor blade and having expanded after passing through the second-stage stationary vane, and is high enough to prevent condensation of liquid drops on the surface of the second-stage stationary vane. Thus, according to the above embodiment (8), by introducing steam after heating the first-stage stationary vane into the second-stage through hole, it is possible to heat the second-stage stationary vane and reduce the amount of liquid drops that condensate on the surface of the second-stage stationary vane.

(9) In some embodiments, in the above steam turbine (8), the first stage and the second stage are continuous stages.

According to the above embodiment (9), it is possible to heat the stationary vane of the first stage and the stationary vane of the second stage disposed continuously on the downstream side of the first stage, through a single steam path.

(10) In some embodiments, in the steam turbine (8) or (9), when A1 is an area of an inlet opening of the first-stage through hole, A2 is a flow-passage area of the connection passage, and A3 is an area of the outlet opening of the second-stage through hole, expressions A3>A1 and A3>A2 are satisfied.

The amount of steam discharged from the outlet opening of the second-stage through hole is determined mainly by the area A1 of the inlet opening of the first-stage through hole and the flow-passage area A2 of the connection passage. In the above-described embodiment (10), the area A3 of the outlet opening of the second-stage through hole is greater than the area A1 of the inlet opening of the first-stage through hole, and the flow-passage area A2 of the connection passage. Thus, according to the above embodiment (10), it is possible to avoid an excessive increase in the flow velocity of steam discharged to the second cavity from the outlet opening of the second-stage through hole, and thus it is possible to prevent occurrence of erosion on the wall surface (outer peripheral surface of the rotor) of the second cavity due to steam discharged from the outlet opening of the second-stage through hole.

(11) In some embodiments, in the steam turbine according to any one of the above (8) to (10), the outlet opening of the second-stage through hole has an opening toward a farthest back portion of a bottom portion of the second cavity, in a cross-sectional view taken along an axial direction of the rotor.

According to the above embodiment (11), by increasing the distance before steam discharged from the outlet opening of the second-stage through hole collides with the bottom portion of the second cavity, it is possible to prevent occurrence of erosion on the bottom portion of the second cavity (outer peripheral surface of the rotor) due to steam discharged from the outlet opening.

(12) In some embodiments, in the steam turbine according to any one of the above (8) to (11), the outlet opening of the second-stage through hole has an opening toward a downstream side in a rotational direction of the rotor.

According to the above embodiment (12), by increasing the relative distance (time) before steam discharged from the outlet opening of the second-stage through hole collides with the bottom portion of the second cavity, it is possible to prevent occurrence of erosion on the bottom portion of the second cavity (outer peripheral surface of the rotor) due to steam discharged from the outlet opening.

(13) In some embodiments, in the steam turbine according to any one of the above (1) to (12), the first stage is positioned upstream of a final stage of the steam turbine. The final stage includes a final-stage stationary vane fixed to the inner wall portion and a final-stage rotor blade fixed to the rotor at downstream of the final-stage stationary vane. The rotor includes a final-stage cavity having a concave shape and being formed on a portion facing the final-stage stationary vane, the final-stage cavity being in communication with the inner space at upstream of the final-stage stationary vane. The final-stage stationary vane includes a final-stage through hole which is in communication with the final-stage cavity and which is formed through the final-stage stationary vane in the radial direction. The steam turbine is configured such that steam introduced from an inlet opening of the final-stage cavity flows through the final-stage through hole.

According to the above embodiment (13), in addition to the above described effect to prevent moisture loss and erosion in a region downstream of the first-stage stationary vane by heating the first-stage stationary vane, the amount of liquid drops that condensate on the surface of the final-stage stationary vane is reduced by heating the final-stage stationary vane with steam introduced into the final-stage through hole from the final-stage cavity, and thereby it is possible to prevent occurrence of moisture loss and erosion at the final-stage rotor blade.

(14) In some embodiments, in the above steam turbine (13), the final-stage stationary vane is formed to have a hollow shape in cross section, including a pressure side portion having a plate shape and a suction side portion having a plate shape and defining a cavity portion between the pressure side portion and the suction side portion. The pressure side portion of the final-stage stationary vane has a slit being in communication with the cavity portion. The final-stage stationary vane includes a division plate dividing the cavity portion into a droplet-removing flow passage being in communication with the slit and the final-stage through hole.

According to the above embodiment (14), the above described final-stage stationary vane is configured as a so-called sheet metal stationary vane, including a pressure side portion having a plate shape and a suction side portion having a plate shape and defining a cavity portion with the pressure side portion. Such a sheet metal stationary vane has a smaller heat capacity than a typical casted stationary vane. Thus, by allowing steam to flow through the final-stage through hole, it is possible to obtain a high effect to heat the final-stage stationary vane.

Further, according to the above embodiment (14), a slit being in communication with the cavity portion is formed on the pressure side portion of the final-stage stationary vane, and thus it is possible to remove liquid drops flowing through the surface of the pressure side portion of the final-stage stationary vane through the slit. Furthermore, since the cavity portion of the final-stage stationary vane is divided into the droplet-removing flow passage being in communication with the slit and the final-stage through hole by the division plate, it is possible to remove liquid drops through the slit and heat the final-stage stationary vane at the same time.

(15) In some embodiments, in the above steam turbine (14), when defining a super-cooled suction side portion as a downstream side of a throat position, of the suction side portion of the final-stage stationary vane, the final-stage through hole is formed so as to face the super-cooled suction side portion inside the final-stage stationary vane.

The present inventors conducted intensive researches and found that main steam passing through the final-stage stationary vanes that are adjacent to each other in the circumferential direction expands at the downstream of the position of the throat, and thereby the temperature decreases. That is, of the final-stage stationary vane, liquid drops condensate the most at the downstream side of the position of the throat, of the suction side portion of the final-stage stationary vane. Thus, according to the above embodiment (15), by forming the final-stage through hole so as to face the super-cooled suction side portion where liquid drops condensate the most, it is possible to suppress the amount of liquid drops that condensate on the surface of the final-stage stationary vane effectively.

(16) In some embodiments, in the steam turbine according to any one of the above (1) to (15), a first-stage annular space having an annular shape and being in communication with the first-stage through hole is formed inside the inner wall portion supporting the first-stage stationary vane.

Condensation of liquid drops may occur not only on the surface of the first-stage stationary vane, but also on the surface of the inner wall portion of the casing. When liquid drops condensate on the surface of the inner wall portion of the casing, the liquid drops may scatter downstream, and cause moisture loss and erosion described above. Thus, according to the above embodiment (15), by introducing steam after flowing through the first-stage through hole into the first-stage annular space to heat the inner wall portion, it is possible to suppress the amount of liquid drops that condensate on the surface of the inner wall portion.

(17) In some embodiments, in the steam turbine according to any one of the above (1) to (16), the first-stage stationary vane is formed to have a hollow shape in cross section, including a pressure side portion having a plate shape and a suction side portion having a plate shape and defining a cavity portion between the pressure side portion and the suction side portion.

According to the above embodiment (17), the above described first-stage stationary vane is configured as a so-called sheet metal stationary vane, including a pressure side portion having a plate shape and a suction side portion having a plate shape and defining a cavity portion with the pressure side portion. Such a sheet metal stationary vane has a smaller heat capacity than a typical casted stationary vane. Thus, by allowing steam to flow through the first-stage through hole, it is possible to obtain a higher effect to heat the first-stage stationary vane.

(18) In some embodiments, in the above steam turbine (17), the first-stage stationary vane includes a division plate dividing the cavity portion into the first-stage through hole and a space other than the first-stage through hole, and, when defining a super-cooled suction side portion as a downstream side of a throat position, of the suction side portion of the first-stage stationary vane, the first-stage through hole is formed so as to face the super-cooled suction side portion inside the first-stage stationary vane.

The present inventors conducted intensive researches and found that main steam passing through the first-stage stationary vanes that are adjacent to each other in the circumferential direction expands at the downstream of the position of the throat, and the thereby the temperature decreases. That is, of the first-stage stationary vane, liquid drops condensate the most at the downstream side of the position of the throat, of the suction side portion of the first-stage stationary vane. Thus, according to the above embodiment (18), by forming the first-stage through hole so as to face the super-cooled suction side portion where liquid drops condensate the most, it is possible to suppress the amount of liquid drops that condensate on the surface of the first-stage stationary vane effectively.

Advantageous Effects

According to at least one embodiment of the present invention, it is possible to provide a steam turbine whereby it is possible to prevent moisture loss and erosion, with a simple structure where the first-stage through hole is merely formed through the first-stage stationary vane in the radial direction.

BRIEF DESCRIPTION OF DRAWINGS

FIG. 8A and FIG. 8B are a schematic cross-sectional view of a steam turbine according to an embodiment of the present invention.

FIG. 9A and FIG. 9B are a schematic cross-sectional view of a steam turbine according to an embodiment of the present invention.

FIG. 10 is a diagram for describing a wet region in a steam turbine according to an embodiment of the present invention.

FIG. 11 is a diagram for describing a leak steam amount that flows the second cavity in a steam turbine according to an embodiment of the present invention.

DETAILED DESCRIPTION

Figure 1:
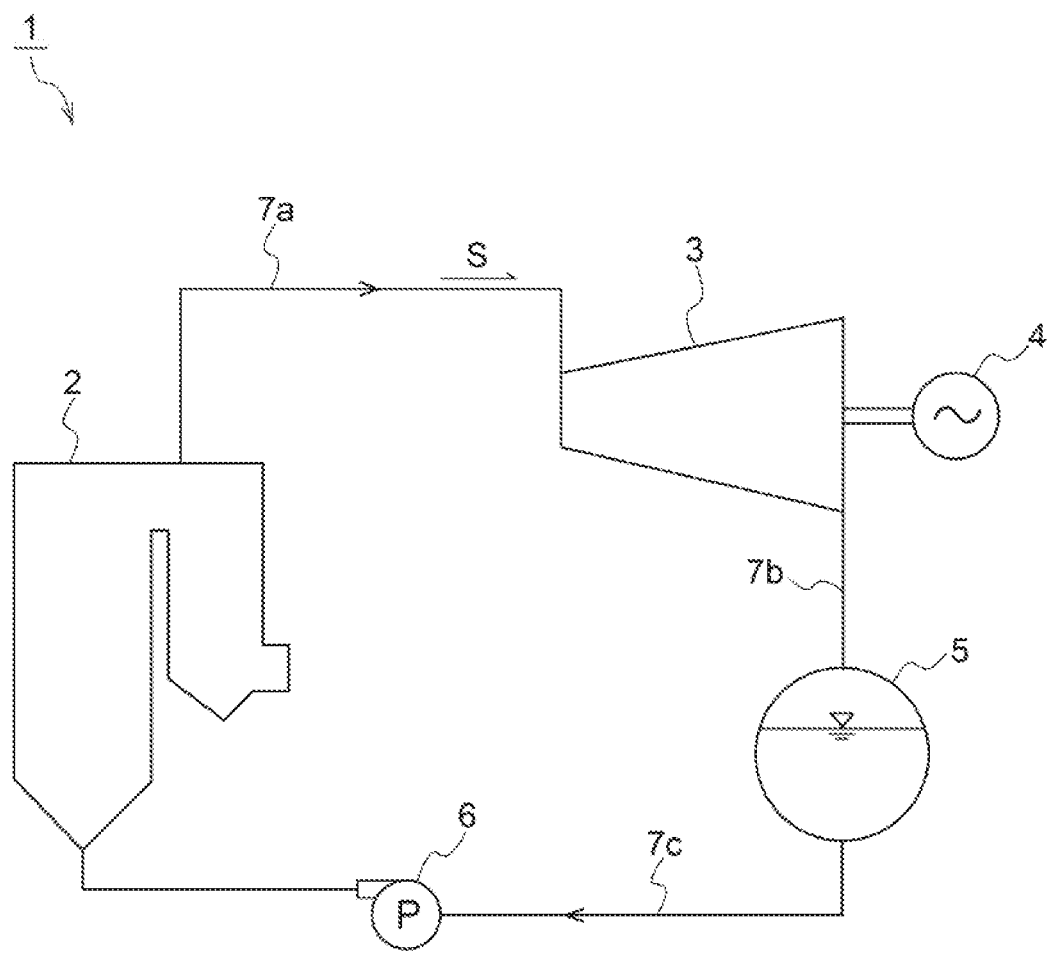
FIG. 1 is an overall configuration diagram of a steam turbine plant including a steam turbine according to an embodiment of the present invention.
Figure 2B:
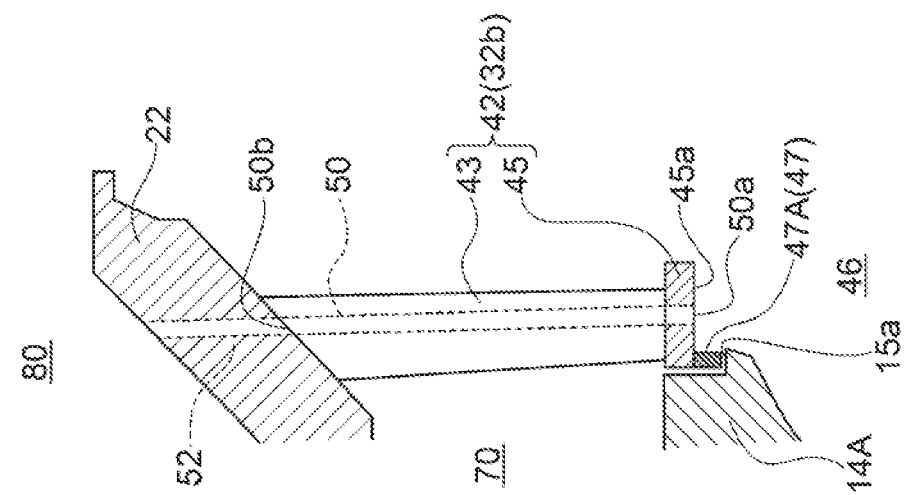
FIG. 2A and FIG. 2B are a schematic cross-sectional view of a steam turbine according to an embodiment of the present invention.
Figure 2A:
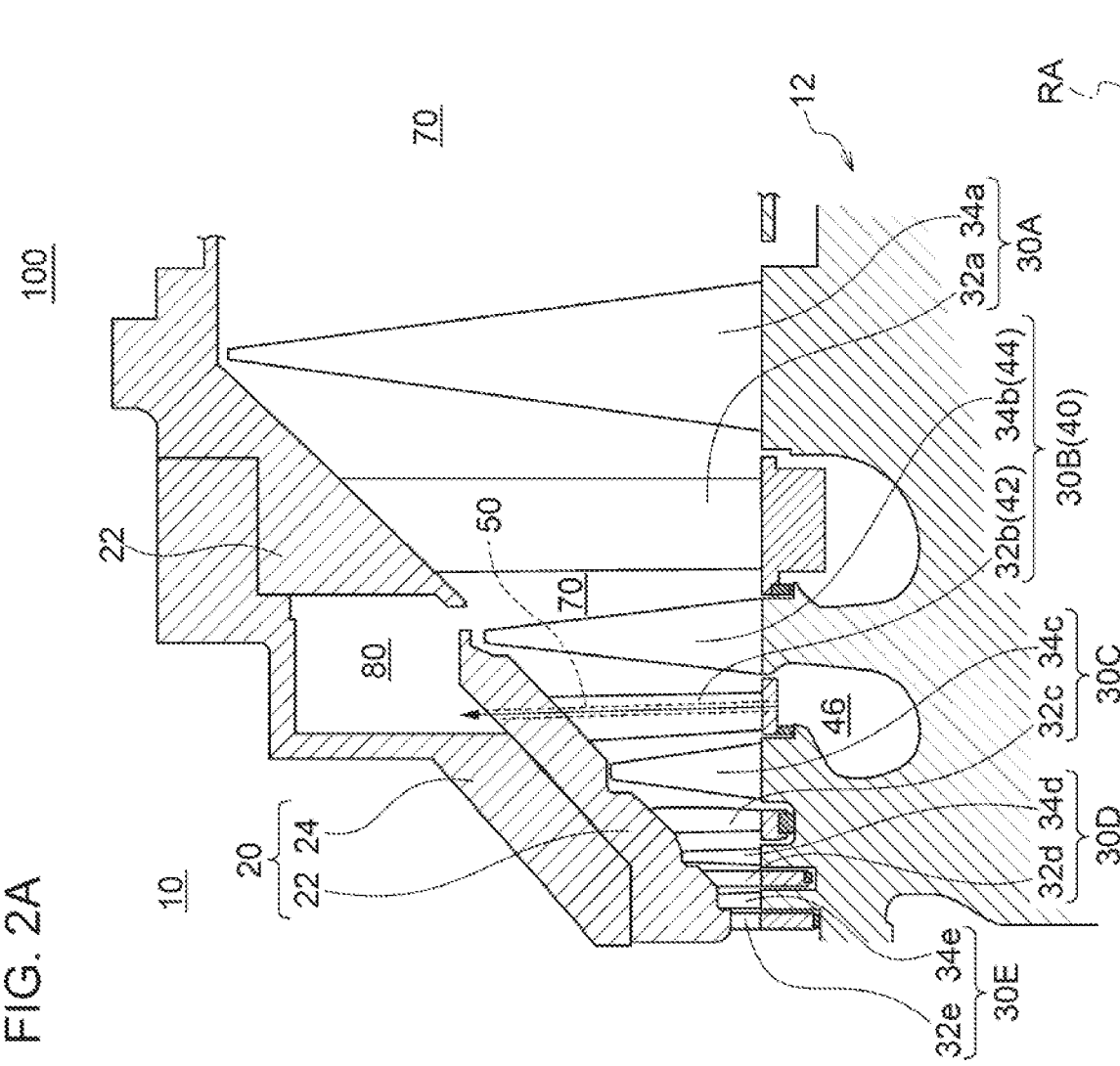

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Further, in the description below, some the same features are associated with the same reference numerals and not described again.

FIG. 1 is an overall configuration diagram of a steam turbine plant including a steam turbine according to an embodiment of the present invention. In FIG. 1, the steam turbine plant 1 includes a boiler 2, a steam turbine device 3, a generator 4, a condenser 5, and a water supply pump 6.

In the steam turbine plant 1 depicted in FIG. 1, steam S1 generated in the boiler 2 is supplied to the steam turbine device 3 via a steam supply pipe 7a. The steam S supplied to the steam turbine device 3 is supplied to the condenser 5 via a condensate-water supply pipe 7b after driving the steam turbine device 3. Further, the condensate-water condensed in the condenser 5 is pressurized by the water supply pump 6, and thereby supplied to the boiler 2 as boiler water, via a boiler-water supply pipe 7c.

Further, the generator 4 is driven by the above described steam turbine device 3.

FIGS. 2 to 9 are each a schematic cross-sectional view of a steam turbine according to an embodiment of the present invention. In FIGS. 2 to 9, FIGS. 2A to 9A are schematic cross-sectional diagrams showing the entire steam turbine, and FIGS. 2B to 9B are schematic cross-sectional diagrams showing the first-stage stationary vanes in enlarged view.

In FIGS. 2 to 9, only one side (upper side) of the axis RA is shown for the sake of convenience. The other side (lower side) of the axis RA has the same configuration.

The steam turbine 10 according to an embodiment of the present invention corresponds to a steam turbine device 3 in the above described steam turbine plant 1.

As depicted in FIGS. 2 to 9, the steam turbine 10 according to an embodiment of the present invention includes a rotor 12 that rotates about the axis RA, a casing 20 that accommodates the rotor 12 rotatably, and a first stage including a first-stage stationary vane 42 fixed to an inner wall portion 22 of the casing 20, and a first-stage rotor blade 44 fixed to the rotor 12 at the downstream side of the first-stage stationary vane 42.

The casing 20 includes the inner wall portion 20 that defines an inner space 70 between the inner wall portion 20 and the rotor 12, and an outer wall portion 24 that defines an outer space 80 described below between the inner wall portion 22 and the outer wall portion 24. The inner space 70 is a space where steam introduced into the steam turbine 10 flows at a high speed. The above described first-stage stationary vane 42 extends along the radial direction of the rotor 12 so as to traverse the inner space 70 toward the rotor 12 from the inner wall portion 22. Furthermore, the above described first-stage rotor blade 44 extends along the radial direction of the rotor 12 so as to traverse the inner space 70 toward the inner wall portion 22 from the rotor 12.

Further, in the embodiments depicted in FIGS. 2 to 9, the steam turbine 10 has five stages 30A, 30B, 30C, 30D, and 30E, in this order from the downstream side. Each one of the stages 30A to 30E includes stationary vanes 32a to 32e fixed to the inner wall portion 22 and rotor blades 34a to 34e fixed to the rotor 12. A plurality of stationary vanes 32a to 32e are disposed at predetermined intervals in the circumferential direction of the rotor 12. Further, a plurality of rotor blades 34a to 34e are disposed at predetermined intervals along the circumferential direction of the rotor 12. Further, in the embodiments depicted in FIGS. 2 to 6, the stage 30B positioned next to and upstream of the final stage 30A is the first stage 40 according to an embodiment of the present invention. Further, the stationary vane 32b of the stage 30B is the first-stage stationary vane 42 according to an embodiment of the present invention. Further, in the embodiments depicted in FIGS. 7 and 8, the stage 30C positioned second next to and upstream of the final stage 30A is the first stage 40 according to an embodiment of the present invention. Further, the stationary vane 32c of the stage 30C is the first-stage stationary vane 42 according to an embodiment of the present invention. Further, in the embodiment depicted in FIG. 9, the final stage 30A is the first stage 40 according to an embodiment of the present invention. Further, the stationary vane 32a of the stage 30A is the first-stage stationary vane 42 according to an embodiment of the present invention.

In the embodiment depicted in FIGS. 2 to 9, the rotor 12 has a first cavity 46 having a concave shape, formed on a portion facing the above described first-stage stationary vane 42. The first cavity 46 has an annular shape that extends over the entire periphery of the rotor 12. Further, the first cavity 46 is in communication with the inner space 70 on the upstream side of the first-stage stationary vane 42. Thus, a part of steam flowing through the inner space 70 leaks to the first cavity 46.

Further, in the steam turbine 10 according to an embodiment of the present invention, the above-described first-stage stationary vane 42 has a first-stage through hole 50 that is in communication with the first cavity 46 and that is formed through the first-stage stationary vane 42 in the radial direction (direction substantially orthogonal to the axis RA). Further, steam introduced from the first cavity 46 via the inlet opening 50a of the first-stage through hole 50 flows through the first-stage through hole 50.

In the steam turbine 10 according to an embodiment of the present invention having the above configuration, the first-stage stationary vane 42 is configured such that steam introduced from the first cavity 46 via the inlet opening 50a flows through the first-stage through hole 50 outward in the radial direction. The first cavity 46 is in communication with the inner space 70 on the upstream side of the first-stage stationary vane 42, and thus steam introduced into the first-stage through hole 50 has a higher temperature than the temperature of main steam that has expanded after passing through the first-stage stationary vane 42. The temperature of steam introduced into the first-stage through hole 50 is higher than the temperature of main steam that has expanded after passing through the first-stage stationary vane 42 by approximately 10-30° C. The temperature of the steam is not high enough to evaporate liquid drops adhering to the surface of the first-stage stationary vane 42, but is high enough to prevent condensation of liquid drops on the surface of the first-stage stationary vane 42.

Thus, according to this embodiment, through a simple structure where the first-stage through hole 50 is merely formed through the radial direction of the first-stage stationary vane 42, the first-stage stationary vane 42 is heated and the amount of liquid drops that condensate on the surface of the first-stage stationary vane 42 is reduced, and thereby it is possible to prevent occurrence of moisture loss and erosion in the region downstream of the first-stage stationary vane 42.

In some embodiments, as depicted in FIGS. 2 to 8, the above described first stage 40 is positioned upstream of the final stage 30A of the steam turbine 10.

According to this embodiment, by reducing the amount of liquid drops that condensate on the surface of the first-stage stationary vane 42, it is possible to prevent occurrence of moisture loss and erosion in the final stage 30A in the region downstream of the first-stage stationary vane 42.

FIG. 10 is a diagram for describing a wet region in a steam turbine according to an embodiment of the present invention.

In some embodiments, as depicted in FIG. 10, in the steam turbine 10, the above described first stage 40 is positioned in the wet region Rw, which is a region downstream of a change position where main steam flowing through the inner space 70 changes from dry steam to wet steam. Furthermore, in a case where there are a plurality of stages 30A, 30B in the wet region Rw, the first stage 40 is the stage 30B positioned most upstream in the wet region Rw.

In the depicted embodiment, main steam enters the wet region Rw from the dry region Rd at a position between the stage 30B and the stage 30C. Further, depending on the steam turbine 10, the position of entering the wet region Rw from the dry region Rd may be a position between the stage 30C and the stage 30D, or a position between the stage 30D and the stage 30E, and is not particularly limited. Further, in the present embodiment, the dry region Rd refers to a region where main steam flowing therein has a wetness that is lower than a predetermined wetness (e.g. 3-4%), and the wet region Rw refers to a region where main stream flowing therein has a predetermined wetness (e.g. 3-4%) or above.

According to this embodiment, by reducing the amount of liquid drops that condensate on the surface of the first-stage stationary vane 42, it is possible to prevent occurrence of moisture loss and erosion in the region downstream of the first-stage stationary vane 42.

In some embodiments, as depicted in FIGS. 2 to 9, the above described first-stage stationary vane 42 includes a stationary vane body portion 43 extending from the inner wall portion 22 toward the rotor 12, and a partition plate 45 having an annular shape and disposed on a tip end portion of the stationary vane body portion 43. Further, the above described inlet opening 50a is formed on the partition plate 45.

A common stationary vane includes an annular plate that divides an inner space 70 through which main steam flows, and a cavity being a concave space formed on the rotor 12, on the tip end portion of the stationary vane body portion. Thus, according to this embodiment, with the inlet opening 50a formed on the partition plate 45 of the first-stage stationary vane 42, it is possible to introduce steam from the first cavity 46 into the first-stage through hole 50 via the inlet opening 50a.

In some embodiments, as depicted in FIGS. 2 to 9, the above described partition plate 45 includes a first seal portion 47 that seals the gap between the partition plate 45 and the rotor 12. Further, the above described inlet opening 50a is formed downstream of the first seal portion 47, or on a position that overlaps with a region where the first seal portion 47 is formed, in the axial direction of the rotor 12.

In the embodiment depicted in FIGS. 2, 4 to 6, and 9, the partition plate 45 is formed to have a width along the axial direction of the rotor 12. Further, the first seal portion 47 is formed as an upstream seal portion 47A formed on the upstream end portion of the outer peripheral surface 45a of the partition plate 45, and the inlet opening 50a is formed downstream of the first seal portion 47 (upstream seal portion 47A). Further, of the rotor 12, the upstream seal portion 47A seals the gap from a sealing surface 14a formed on the rotor disc portion 14 that supports the rotor blade 34c.

Figure 3B:
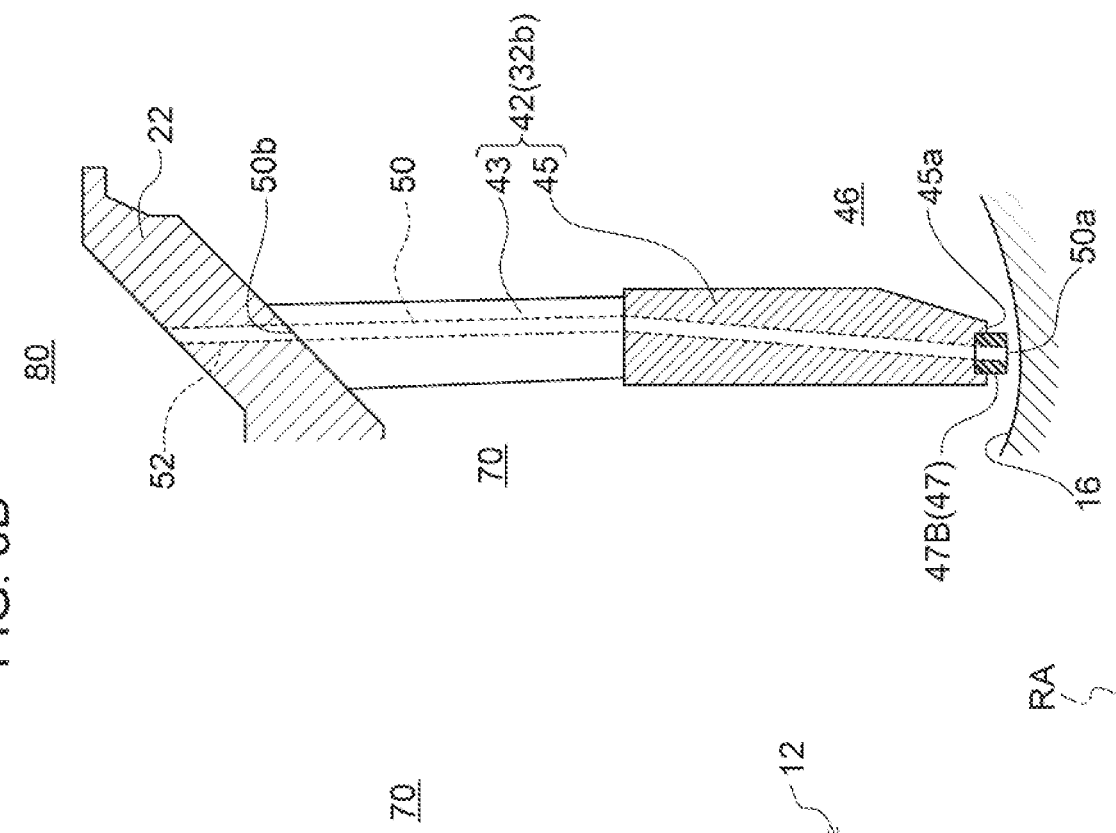
FIG. 3A and FIG. 3B are a schematic cross-sectional view of a steam turbine according to an embodiment of the present invention.
Figure 3A:
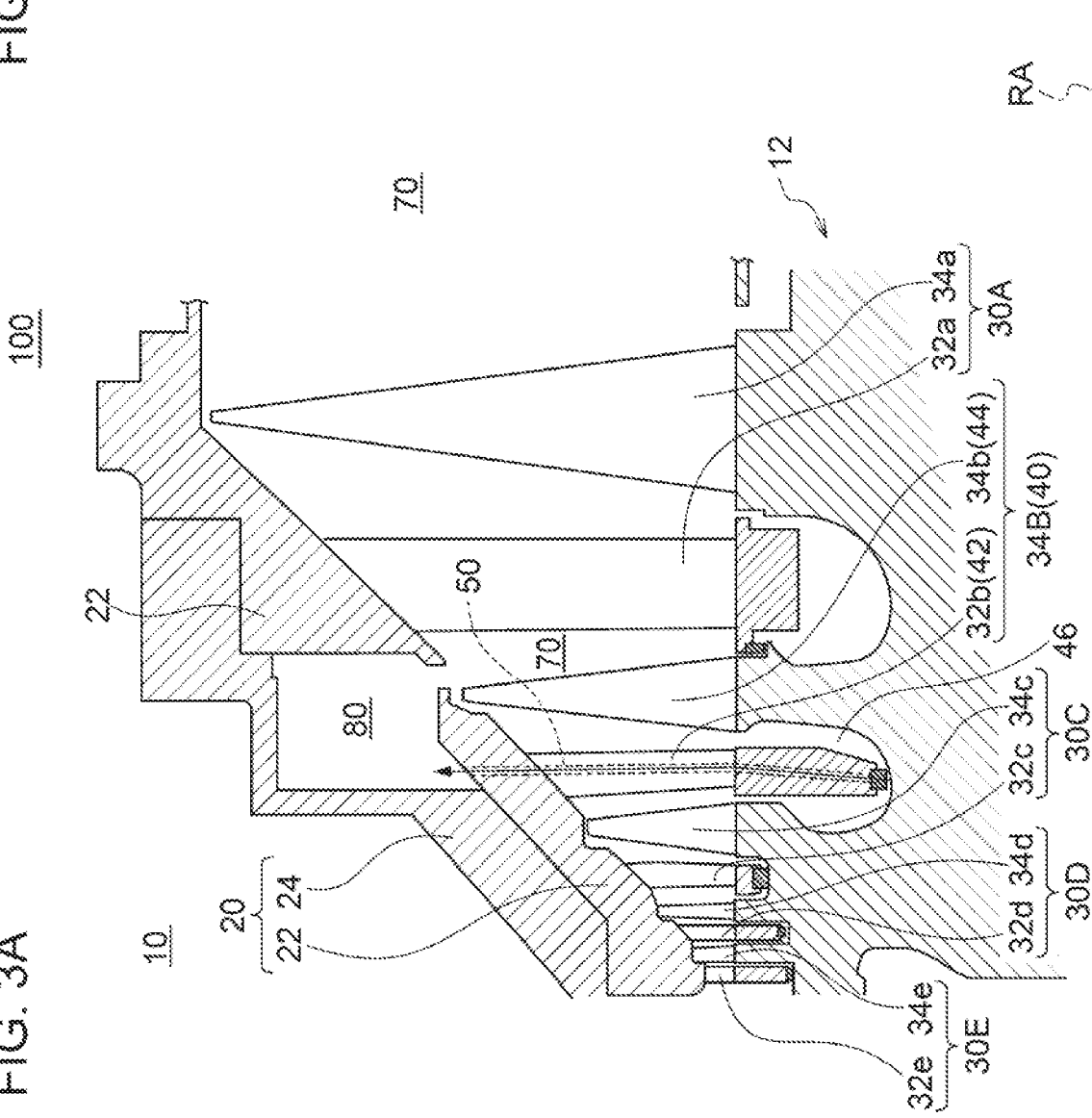
Figure 7B:
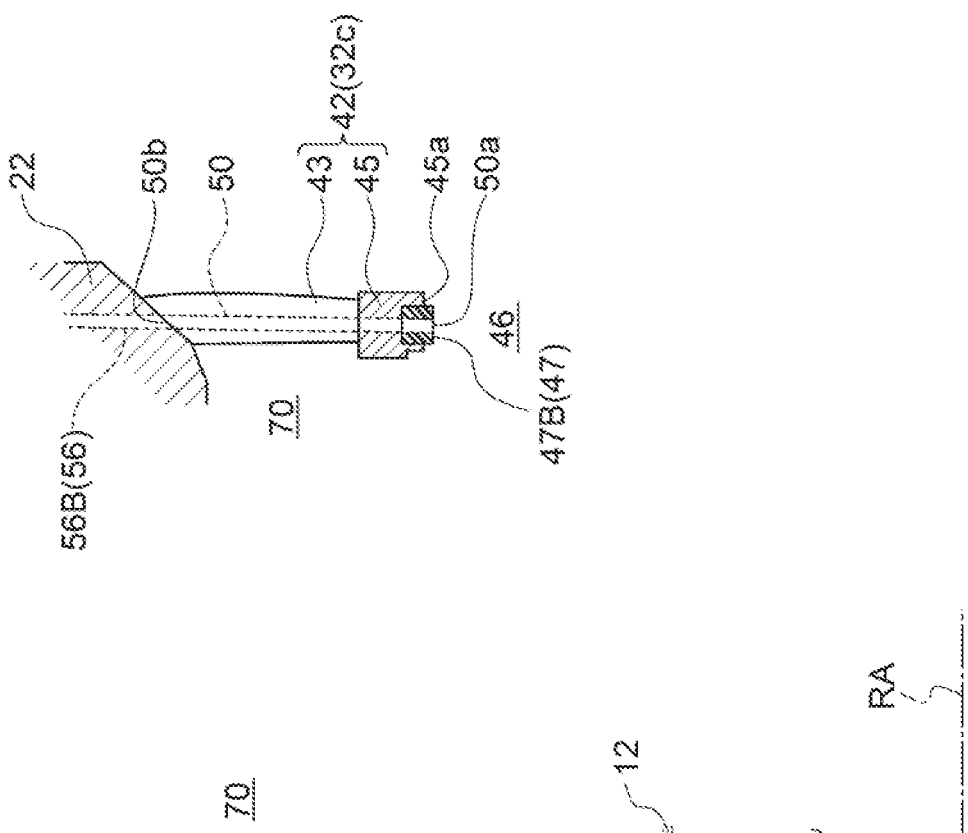
FIG. 7A and FIG. 7B are a schematic cross-sectional view of a steam turbine according to an embodiment of the present invention.
Figure 7A:
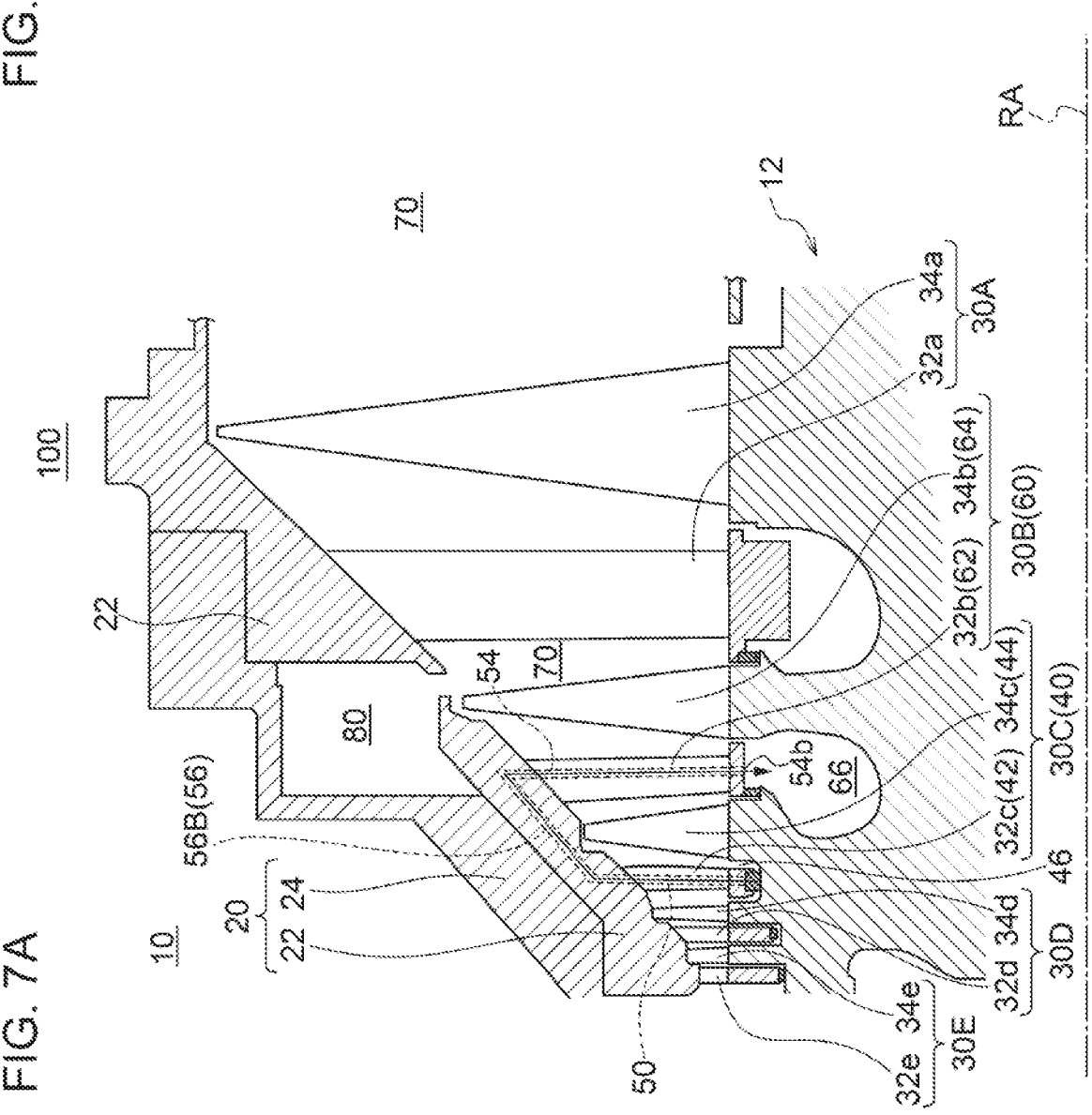

Further, in the embodiment depicted in FIGS. 3, 7, and 8, the partition plate 45 is formed to have a length along the radial direction of the rotor 12. Further, the first seal portion 47 is formed as a bottom-side seal portion 47B formed on a position that faces the bottom portion 16 of the first cavity 46, on the outer peripheral surface 45a of the partition plate 45. Further, the inlet opening 50a is formed on a position that overlaps with a region where the first seal portion 47 is formed (bottom-side seal portion 47B), in the axial direction of the rotor 12. Further, the bottom-side seal portion 47B seals the gap from the bottom portion 16 of the first cavity 46.

In the steam turbine 10, a seal portion that seals the gap between the partition plate 45 and the rotor 12 may be formed, to prevent leakage of main steam flowing through the inner space 70 to the cavity. Thus, according to this embodiment, leak steam after passing through a part of the first seal portion 47 is introduced into the first-stage through hole 50, and thus it is possible to heat the first-stage stationary vane 42 while preventing a great amount of leak steam from flowing into the first-stage through hole 50.

Figure 4B:
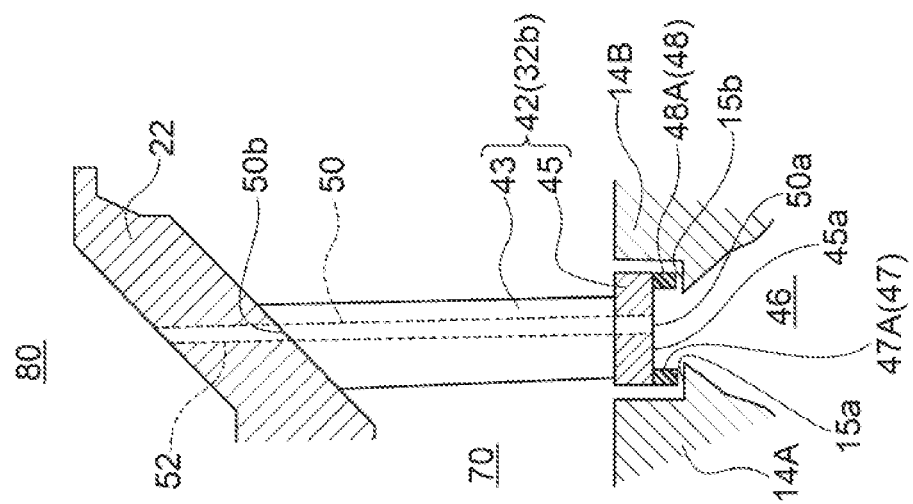
FIG. 4A and FIG. 4B are a schematic cross-sectional view of a steam turbine according to an embodiment of the present invention.
Figure 4A:
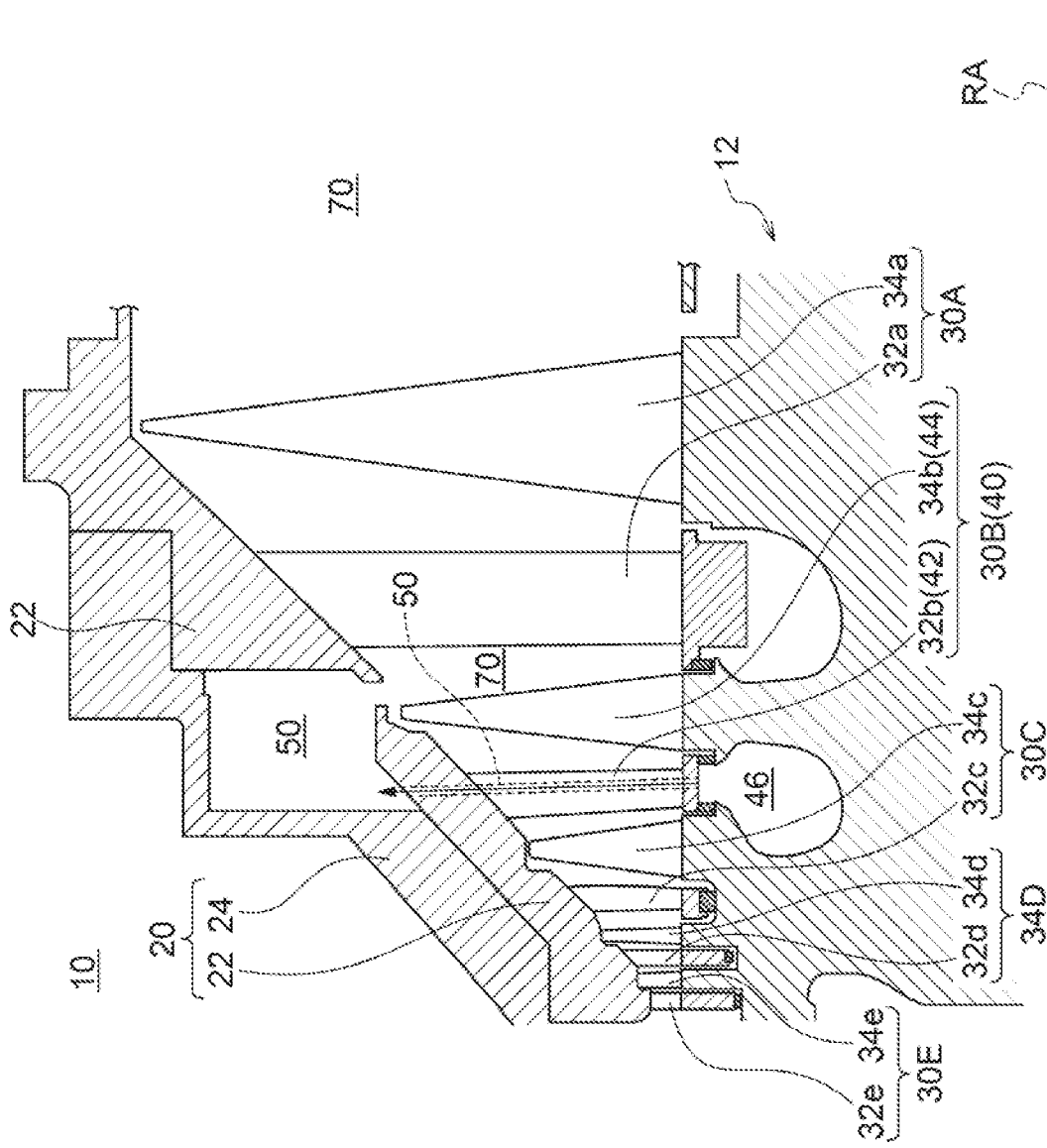

In some embodiments, as depicted in FIG. 4, the above described partition plate 45 includes a second seal portion 48 that seals the gap between the partition plate 45 and the rotor 12, on the downstream side of the first seal portion 47. Further, the above described inlet opening 50a is formed upstream of the second seal portion 48, or on a position that overlaps with a region where the second seal portion 48 is formed, in the axial direction of the rotor 12.

In the embodiment depicted in FIG. 4, the second seal portion 48 is formed as a downstream seal portion 48A formed on the downstream end portion of the outer peripheral surface 45a of the partition plate 45, and the inlet opening 50a is formed upstream of the second seal portion 48 (downstream seal portion 48A). Further, of the rotor 12, the downstream seal portion 48A seals the gap from a sealing surface 15a formed on the rotor disc portion 14B that supports the rotor blade 34b.

Further, in some embodiments, although not depicted, the second seal portion 48 may be formed as a bottom-side second seal portion (not depicted) formed on a position that faces the bottom portion 16 of the first cavity 46, on the outer peripheral surface 45a of the partition plate 45, and that seals the gap from the bottom portion 16 of the first cavity 46. Further, the inlet opening 50a may be formed on a position that overlaps with a region where the bottom-side second seal portion (not depicted) is formed, in the axial direction of the rotor 12.

According to this embodiment, by forming the second seal portion 48 in addition to the above described first seal portion 47, it is possible to reduce the amount of main steam that leaks to the downstream side of the first-stage stationary vane 42 via the first cavity 46 from the inner space 70.

In some embodiments, as depicted in FIGS. 2 to 4, the above-described casing 20 further includes an outer wall portion 24 that defines the outer space 80 formed on the radially outer side of the inner space 70, between the inner wall portion 22 and the outer wall portion 24. The above described outer space 80 is formed on a position that overlaps with a region where the first-stage stationary vane 47 is formed, in the axial direction of the rotor 12, and is in communication with the inner space 70 on the downstream side of the first-stage stationary vane 42. Further, steam flowing out from the above described first-stage through hole 50 is discharged to the outer space 80 from the outlet opening 50b of the first-stage through hole 50.

In the depicted embodiment, on the inner wall portion 22 supporting the first-stage stationary vane 42, a wall-portion side through hole 52 being in communication with the outlet opening 50b of the first-stage through hole 50 is formed. Further, steam flowing out from the above described first-stage through hole 50 is discharged to the outer space 80 from the outlet opening 50b of the first-stage through hole 50 via the wall-portion side through hole 52.

In the steam turbine 10, an outer space 80 may be formed on the radially outer side of the inner space 70. Thus, according to this embodiment, by discharging steam after flowing through the first-stage through hole 50 to the outer space 80 from the outlet opening 50b of the first-stage through hole 50, it is possible to introduce steam continuously from the first cavity 46 to the first-stage through hole 50.

In some embodiments, as depicted in FIGS. 5 to 8, the above described steam turbine 10 further includes a second stage 60 that includes a second-stage stationary vane 62 fixed to the inner wall portion 22 and a second-stage rotor blade 64 fixed to the rotor 12 at the downstream of the second-stage stationary vane 62, positioned downstream of the first stage 40. The above-described rotor 12 includes a second cavity 66 which has a concave shape formed on a portion facing the second-stage stationary vane 62 and which is in communication with the inner space 70 at the upstream of the second-stage stationary vane 62. The second cavity 66 has an annular shape that extends over the entire periphery of the rotor 12. The above-described second-stage stationary vane 62 has a second-stage through hole 54 which is in communication with the second cavity 66 and which is formed through the second-stage stationary vane 62 in the radial direction. Further, the above-described steam turbine 10 further includes a connection passage 56 connecting the first-stage through hole 50 and the second-stage through hole 54, and is configured such that steam after flowing through the first-stage through hole 50 flows through the connection passage 56 and the second-stage through hole 54 and is discharged to the second cavity 66 from the outlet opening 54b of the second-stage through hole 54.

Figure 5B:
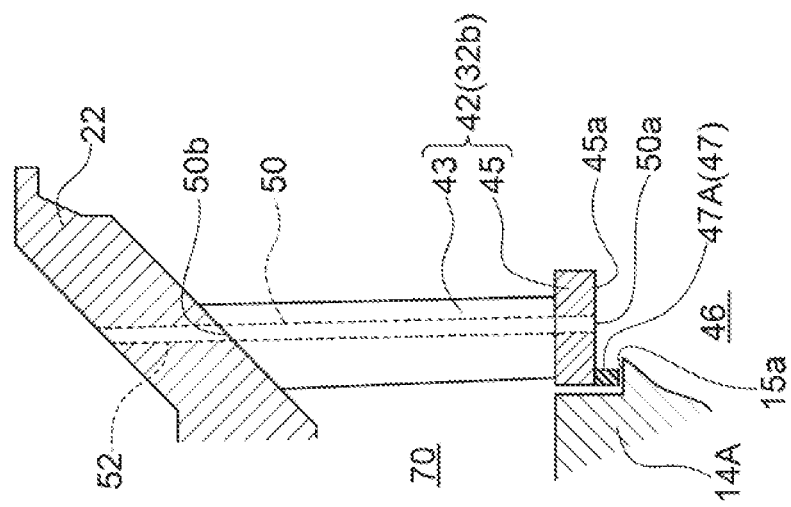
FIG. 5A and FIG. 5B are a schematic cross-sectional view of a steam turbine according to an embodiment of the present invention.
Figure 5A:
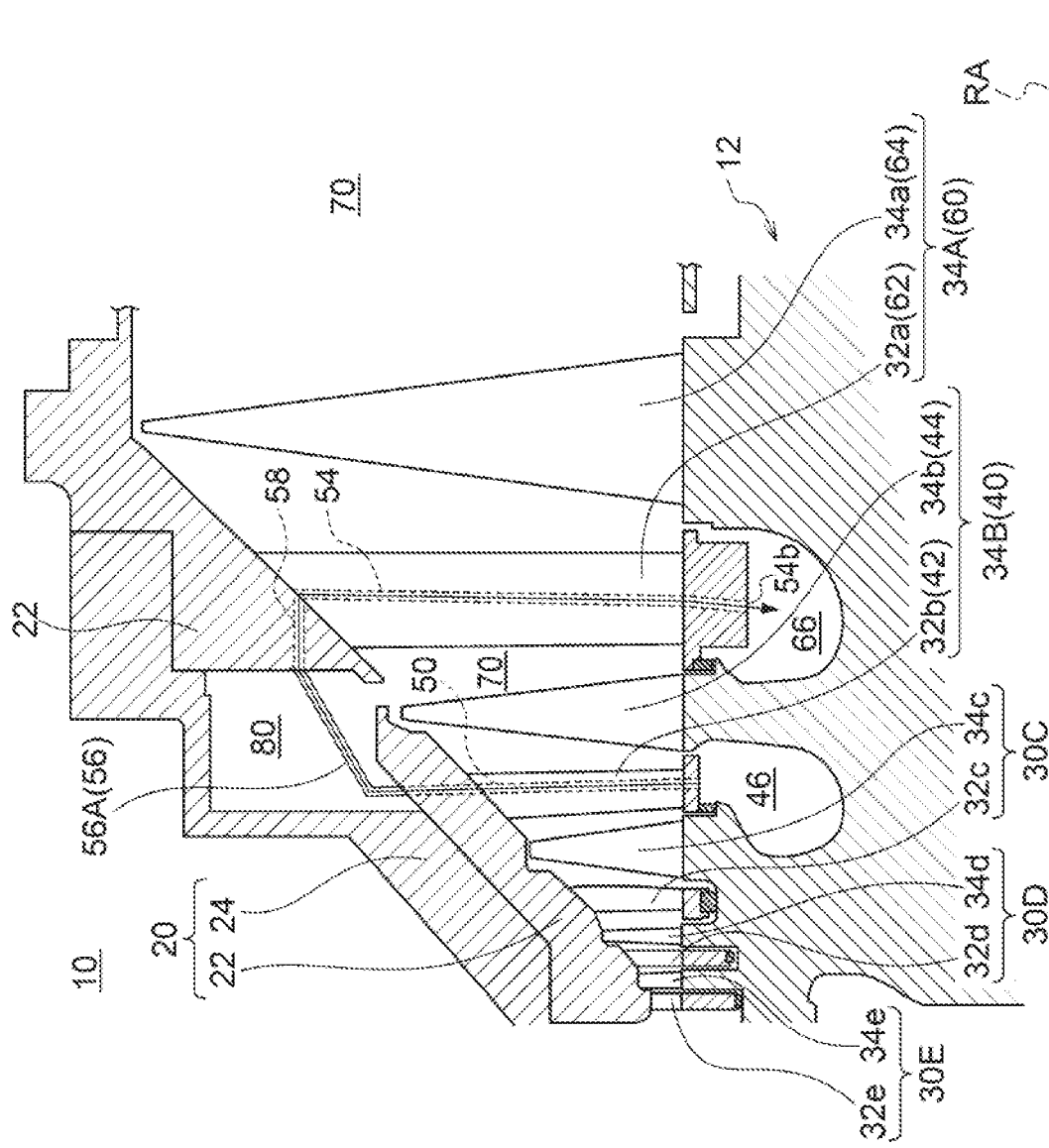
Figure 6A:
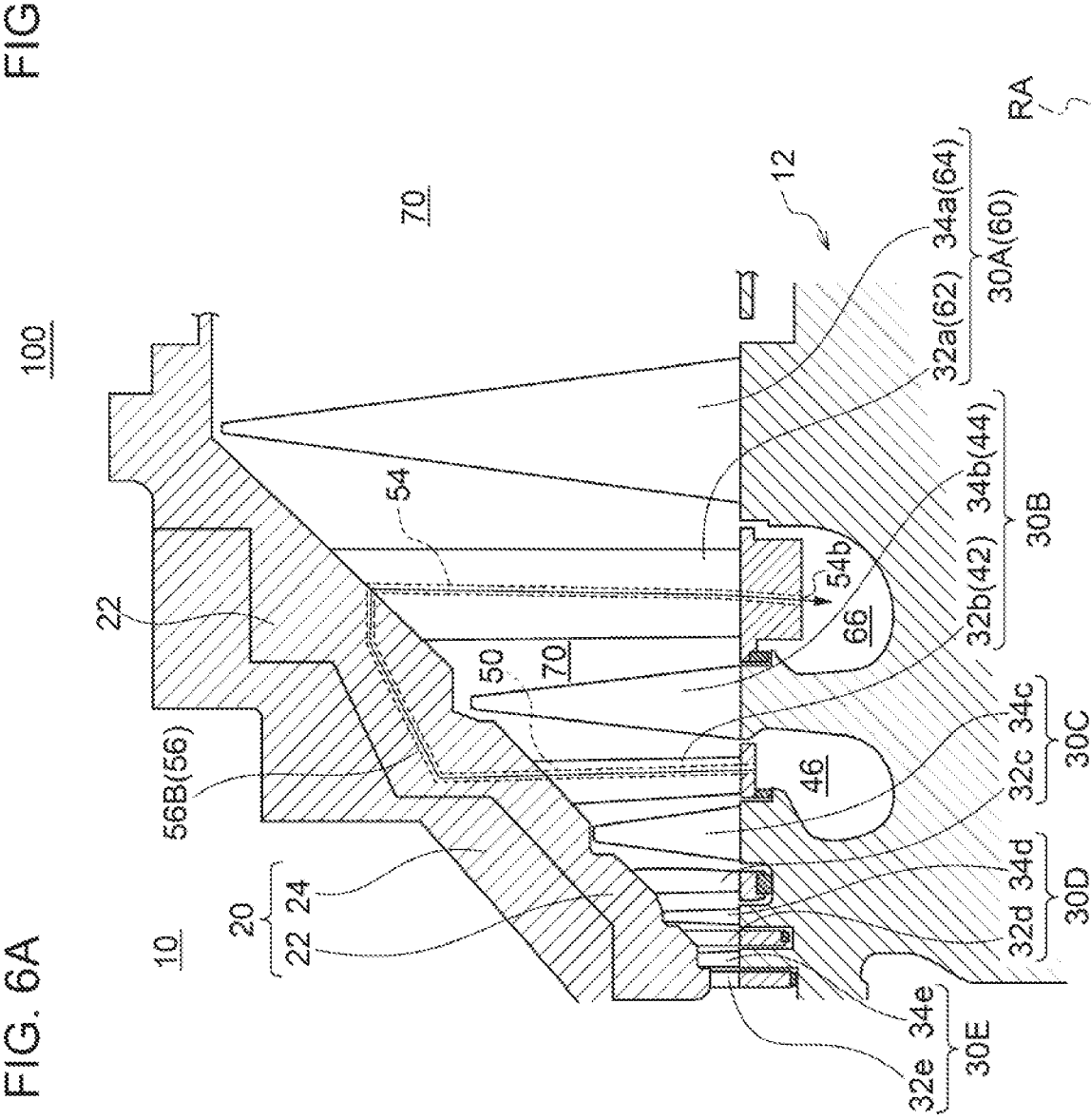
FIG. 6A and FIG. 6B are a schematic cross-sectional view of a steam turbine according to an embodiment of the present invention.
Figure 6B:
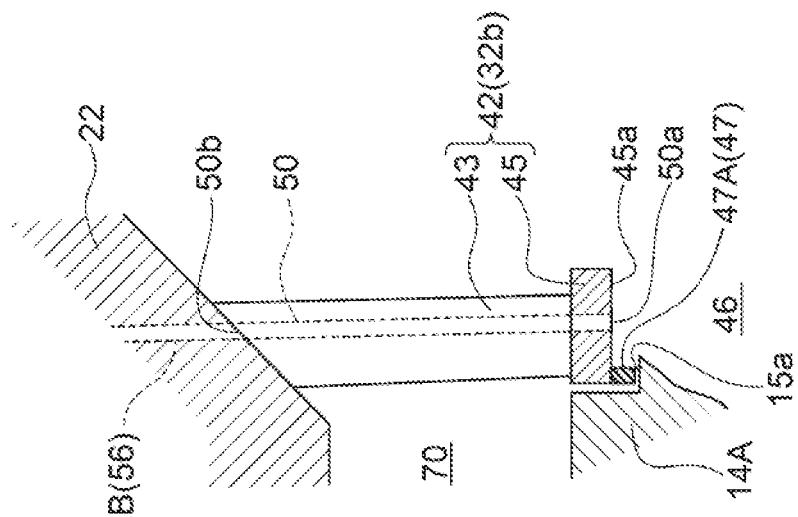

In the embodiment depicted in FIGS. 5 and 6, the final stage 30A is the second stage 60 according to an embodiment of the present invention. Further, in the embodiments depicted in FIGS. 7 and 8, the stage 30B positioned next to and upstream of the final stage 30A is the second stage 60 according to an embodiment of the present invention.

Further, in the embodiment depicted in FIG. 5, on the inner wall portion 22 supporting the second-stage stationary vane 62, a wall-portion side through hole 52 being in communication with the outlet opening 50b of the first-stage through hole 50 is formed. Further, on the inner wall portion 22 supporting the second-stage stationary vane 62, a second wall-portion side through hole 58 being in communication with the second-stage through hole 54 is formed. Further, the connection passage 56 includes a connection pipe passage 56A which is disposed in the outer space 80 and which brings the wall-portion side through hole 52 and the second wall-portion side through hole 58 into communication.

On the other hand, in the embodiment depicted in FIGS. 6 to 8, the connection passage 56 includes a through hole 56B formed inside the inner wall portion 22.

The temperature of steam after heating the first-stage stationary vane 42 is higher than the temperature of main steam having performed work on the first-stage rotor blade 44 and having expanded after passing through the second-stage stationary vane 62, and is high enough to prevent condensation of liquid drops on the surface of the second-stage stationary vane 62. Thus, according to this embodiment, by introducing steam after heating the first-stage stationary vane 42 into the second-stage through hole 54, it is possible to heat the second-stage stationary vane 62 and reduce the amount of liquid drops that condensate on the surface of the second-stage stationary vane 62.

Further, according to this embodiment, as described below, it is possible to reduce the leak flow rate that flows into the second cavity 66 from the upstream side of the second-stage stationary vane 62 in the inner space 70.

FIG. 11 is a diagram for describing a leak steam amount that flows through the second cavity in a steam turbine according to an embodiment of the present invention.

As depicted in FIG. 11, the steam flow rate Q2 that flows out to the downstream side of the second-stage stationary vane 62 in the inner space 70 from the second cavity 66 is a sum of the leak flow rate Q1 flowing into the second cavity 66 from the upstream side of the second-stage stationary vane 62 in the inner space 70 and the steam flow rate Q3 discharged into the second cavity 66 via the second-stage through hole 54 (Q2=Q1+Q3). Herein, Q2 is determined by the differential pressure ($\Delta P = P3 - P2$) between the pressure P3 in the second cavity 66 and the pressure P2 downstream the second-stage stationary vane 62 in the inner space 70, and the differential pressure $\Delta P$ does not change considerably even when steam flows into the second cavity 66 from the second-stage through hole 54. Thus, by discharging steam that has flowed through the second-stage through hole 54 to the second cavity 66, it is possible to reduce the leak flow rate Q1 that flows into the second cavity 66 from the upstream side of the second-stage stationary vane 62 in the inner space 70. Furthermore, for instance, by providing a seal portion between the partition plate 65 of the second-stage stationary vane 62 and the rotor 12, it is possible to manage the above described Q2 properly.

In some embodiments, as depicted in FIGS. 5 to 8, the above described first stage 40 and the second stage 60 are continuous stages. That is, the first stage 40 is positioned next to and upstream of the second stage 60.

According to this embodiment, it is possible to heat the stationary vane 42 of the first stage 40 and the stationary vane 62 of the second stage 60 disposed continuously on the downstream side of the first stage 40, through a single steam path.

Further, in some embodiments, although not depicted, the first stage 40 may be positioned second or further next to and upstream of the second stage 60.

In some embodiments, as depicted in FIG. 11, when A1 is the area of the inlet opening 50a of the first-stage through hole 50, A2 is the flow-passage area of the connection passage 56, and A3 is the area of the outlet opening 54b of the second-stage through hole 54, A3>A1 and A3>A2. In other words, the area A3 of the outlet opening 54b of the second-stage through hole 54 is greater than the area A1 of the inlet opening 50a of the first-stage through hole 50, and the flow-passage area A2 of the connection passage 56.

In some embodiments, the first-stage through hole 50 may have the same area from the inlet opening 50a to the outlet opening 50b. Further, the connection passage 56 may have the same flow-passage area over the entire length. Further, the second-stage through hole 54 may have the same area from the inlet opening 54a to the outlet opening 54b. Further, the wall-portion through hole 52 may have the same area as that of the first-stage through hole 50 over the entire length of the wall-portion through hole 52. The second wall-portion side through hole 58 may have the same area as the flow-passage area of the connection passage 56 over the entire length.

The amount of steam discharged from the outlet opening 54b of the second-stage through hole 54 is determined mainly by the area A1 of the inlet opening 50a of the first-stage through hole 50 and the flow-passage area A2 of the connection passage 56. In the above-described embodiment, the area A3 of the outlet opening 54b of the second-stage through hole 54 is greater than the area A1 of the inlet opening 50a of the first-stage through hole 50, and the flow-passage area A2 of the connection passage 56. Thus, according to this embodiment, it is possible to prevent an excessive increase in the flow velocity of steam discharged to the second cavity 66 from the outlet opening 54b of the second-stage through hole 54, and thus it is possible to prevent occurrence of erosion on the wall surface (outer peripheral surface of the rotor 12) of the second cavity 66 due to steam discharged from the outlet opening 54b of the second-stage through hole 54.

FIG. 12 is a diagram for explaining an outlet opening of a second-stage through hole in a steam turbine according to an embodiment of the present invention.

Figure 12A:
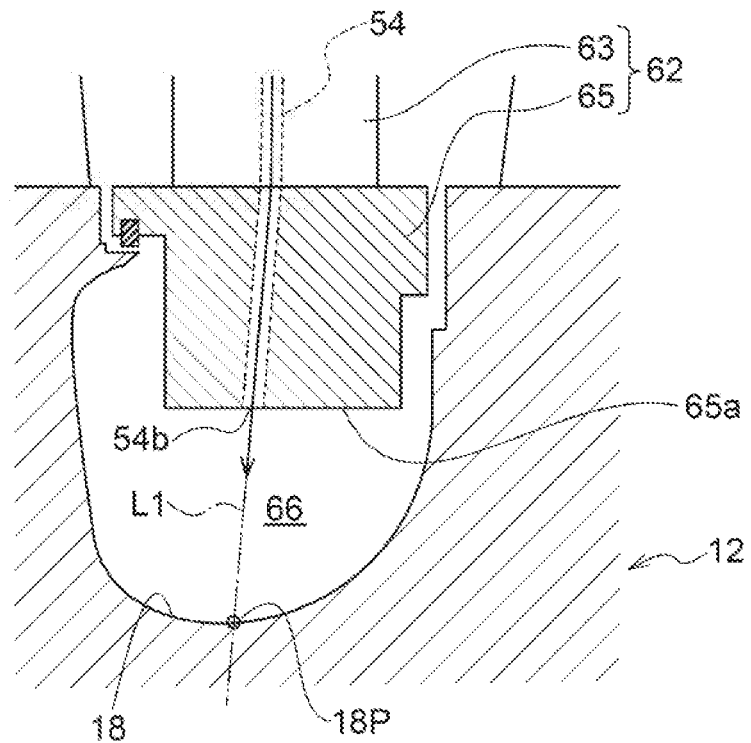
FIG. 12A and FIG. 12B are is a diagram for explaining an outlet opening of a second-stage through hole in a steam turbine according to an embodiment of the present invention.

In some embodiments, as depicted in FIG. 12A, the outlet opening 54b of the above-described second-stage through hole 54 has an opening toward the farthest back portion 18P of the bottom portion 18 of the second cavity 66 in a cross-sectional view along the axial direction of the rotor 12.

In the depicted embodiment, the second-stage stationary vane 62 includes a stationary vane body portion 63 extending from the inner wall portion 22 toward the rotor 12, and a partition plate 65 having an annular shape and disposed on a tip end portion of the stationary vane body portion 63. Further, the above described outlet opening 54b is formed on the outer peripheral surface 65a of the partition plate 65.

Further, in some embodiments, the outlet opening 54b is configured such that an extension line L1 that passes through the center position of the outlet opening 54b and that extends along the extension line of the center line of the second-stage through hole 54 passes through the vicinity of the farthest back portion 18P where the distance to the center line of the rotor 12 in the bottom portion 18 of the second cavity 66 is the shortest (the center of the farthest back portion 18P in the depicted embodiment).

According to this embodiment, by increasing the distance before steam discharged from the outlet opening 54b of the second-stage through hole 54 collides with the bottom portion 18 of the second cavity 66, it is possible to prevent occurrence of erosion on the bottom portion 18 of the second cavity 66 (outer peripheral surface of the rotor 12) due to steam discharged from the outlet opening 54b.

Figure 12B:
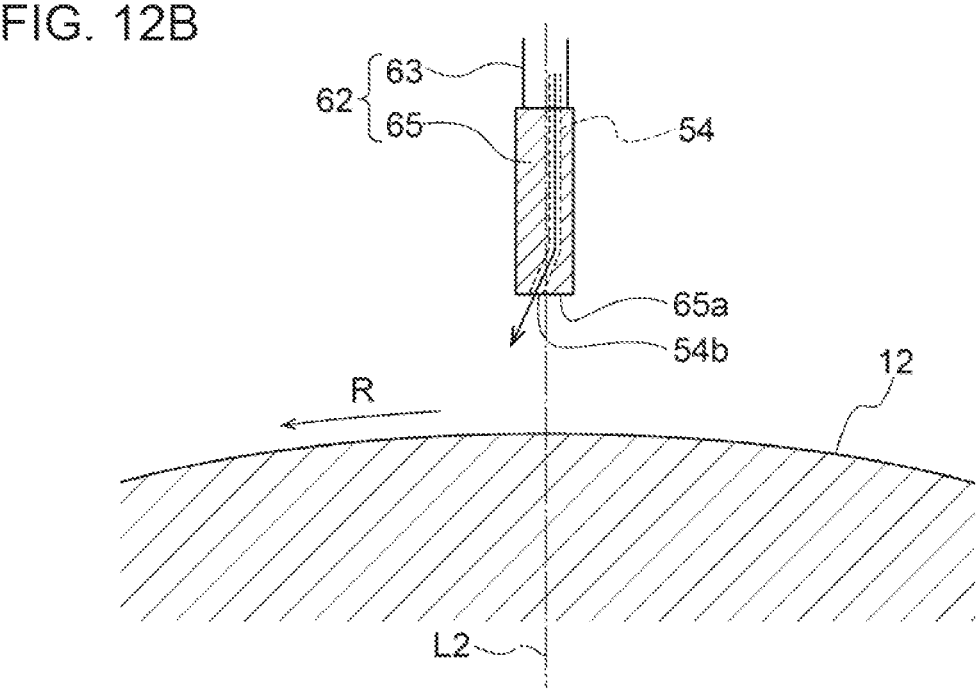

In some embodiments, as depicted in FIG. 12B, the outlet opening 54b of the above-described second-stage through hole 54 has an opening toward the downstream side of the rotational direction R of the rotor 12.

FIG. 12B is a view of the partition plate 65 of the rotor 12 and the second-stage stationary vane 62, as seen along the axial direction of the rotor 12, showing a state where the rotor 12 is rotating in the anti-clockwise direction. Further, the outlet opening 54b of the second-stage through hole 54 has an outlet opening toward the left side of the drawing, with respect to the radial-directional line L2 passing through the rotational center (not depicted) of the rotor 12.

According to this embodiment, by increasing the relative distance (time) before steam discharged from the outlet opening 54b of the second-stage through hole 54 collides with the bottom portion 18 of the second cavity 66, it is possible to prevent occurrence of erosion on the bottom portion 18 of the second cavity 66 (outer peripheral surface of the rotor 12) due to steam discharged from the outlet opening 54b.

In some embodiments, as depicted in FIG. 8, the above described first stage 40 is positioned upstream of the final stage 30A. The final stage 30A includes a final-stage stationary vane 32a fixed to the inner wall portion 22 and a final-stage rotor blade 34a fixed to the rotor 12 at the downstream side of the final-stage stationary vane 32a. The rotor 12 includes a final-stage cavity 86 which has a concave shape formed on a portion facing the final-stage stationary vane 32a and which is in communication with the inner space 70 at the upstream of the final-stage stationary vane 32a. The final-stage stationary vane 32a has a final-stage through hole 90 which is in communication with the final-stage cavity 86 and which is formed through the final-stage stationary vane 32a in the radial direction. Further, steam introduced from the inlet opening 90a of the final-stage cavity 86 flows through the final-stage through hole 90.

In the depicted embodiment, the final-stage stationary vane 32a includes a stationary vane body portion 93 extending from the inner wall portion 22 toward the rotor 12, and a partition plate 95 having an annular shape and disposed on a tip end portion of the stationary vane body portion 93. Further, the above described outlet opening 90a is formed on the outer peripheral surface 95a of the partition plate 95.

Further, in the depicted embodiment, inside the inner wall portion 22 supporting the final-stage stationary vane 32a (the stationary vane body portion 93), a final-stage annular space 97 having an annular shape and being in communication with the final-stage through hole 90 is formed. By introducing steam into the final-stage annular space 97, the surface of the inner wall portion 22 is heated, and thereby it is possible to prevent condensation of liquid drops on the surface of the inner wall portion 22. Further, steam that has flowed into the final-stage annular space 97 through the final-stage through hole 90 is discharged to an exhaust chamber 100 via an outer through hole 99.

According to this embodiment, in addition to the above described effect to prevent moisture loss and erosion in a region downstream of the first-stage stationary vane 42 by heating the first-stage stationary vane 42, the amount of liquid drops that condensate on the surface of the final-stage stationary vane 32a is reduced by heating the final-stage stationary vane 32a with steam introduced into the final-stage through hole 90 from the final-stage cavity 86, and thereby it is possible to prevent occurrence of moisture loss and erosion at the final-stage rotor blade 34a.

Figure 13:
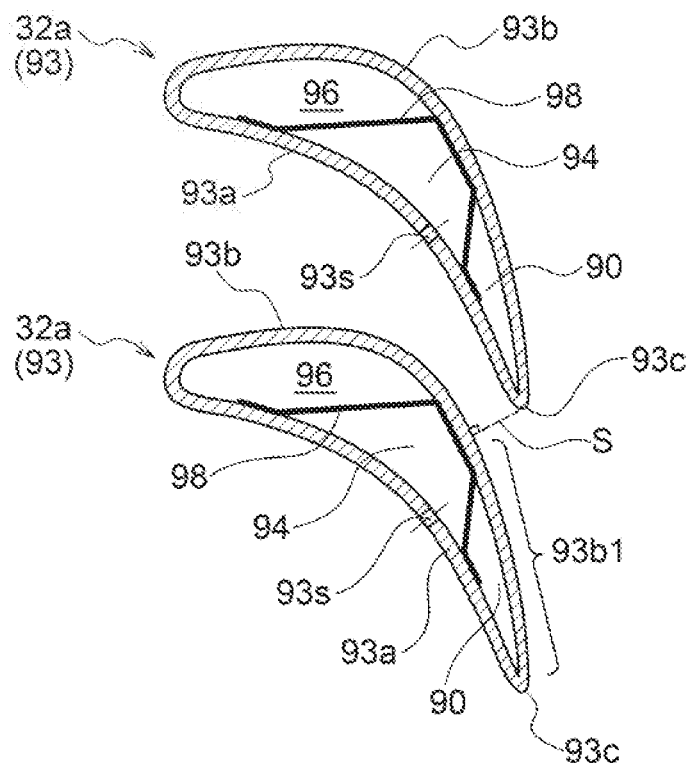
FIG. 13 is a cross-sectional view showing the final-stage stationary vanes of a steam turbine according to an embodiment of the present invention.

FIG. 13 is a cross-sectional view showing the final-stage stationary vanes of a steam turbine according to an embodiment of the present invention.

In some embodiments, as depicted in FIG. 13, the above described final-stage stationary vane 32a (the stationary vane body portion 93 in FIG. 8, or the stationary vane body portion 43 in FIG. 9) is formed to have a hollow shape in cross section, including a pressure side portion 93a having a plate shape and a suction side portion 93b having a plate shape and defining a cavity portion 96 with the pressure side portion 93a. On the pressure side portion 93a of the final-stage stationary vane 32a, a slit 93s is formed, which is in communication with the cavity portion 96 (see FIGS. 8 and 9). Further, the final-stage stationary vane 32a includes a division plate 98 that divides the cavity portion 96 into a droplet-removing flow passage 94 that is in communication with the slit 93s and the final-stage through hole 90.

According to this embodiment, the above described final-stage stationary vane 32a is configured as a so-called sheet metal stationary vane, including a pressure side portion 93a having a plate shape and a suction side portion 93b having a plate shape and defining a cavity portion 96 with the pressure side portion 93a. Such a sheet metal stationary vane has a smaller heat capacity than a typical casted stationary vane. Thus, by allowing steam to flow through the final-stage through hole 90, it is possible to obtain a high effect to heat the final-stage stationary vane 32a.

Further, according to this embodiment, a slit 93s being in communication with the cavity portion 96 is formed on the pressure side portion 93a of the final-stage stationary vane 32a, and thus it is possible to remove liquid drops flowing through the surface of the pressure side portion 93a of the final-stage stationary vane 32a through the slit 93s. Furthermore, since the cavity portion 96 of the final-stage stationary vane 32a is divided into the droplet-removing flow passage 94 being in communication with the slit 93s and the final-stage through hole 90 by the division plate 98, it is possible to remove liquid drops through the slit 93s and heat the final-stage stationary vane 32a at the same time.

In some embodiments, as depicted in FIG. 13, of the suction side portion 93b of the final-stage stationary vane 32a described above, when the downstream side of the position of the throat S is defined as a super-cooled suction side surface 93a1, the final-stage through hole 90 is formed to face the super-cooled suction side portion 93b1 inside the final-stage stationary vane 32a.

Herein, the throat S is a portion where the distance is minimum between a pair of final-stage stationary vanes 32a, 32a that are adjacent to each other in the circumferential direction, and is a position where a line perpendicular to the suction side portion 93b of one of the final-stage stationary vanes 32a passes through the trailing edge 93c of the other one of the final-stage stationary vanes 32a.

Furthermore, the final-stage through hole 90 may face the entire length of the super-cooled suction side portion 93b1, or at least a part of the entire length of the super-cooled suction side portion 93b1.

The present inventors conducted intensive researches and found that main steam passing through the final-stage stationary vanes 32a, 32a that are adjacent to each other in the circumferential direction expands at the downstream of the position of the throat S, and the thereby the temperature decreases. That is, of the final-stage stationary vane 32a, liquid drops condensate the most at the downstream side of the position of the throat S, of the suction side portion 93b of the final-stage stationary vane 32a. Thus, according to this embodiment, by forming the final-stage through hole 90 so as to face the super-cooled suction side portion 93b1 where liquid drops condensate the most, it is possible to suppress the amount of liquid drops that condensate on the surface of the final-stage stationary vane 32a effectively.

In some embodiments, as depicted in FIG. 9, inside the inner wall portion 22 supporting the first-stage stationary vane 42 described above, a first-stage annular space 57 having an annular shape and being in communication with the first-stage through hole 50 is formed.

In the depicted embodiment, the first-stage annular space 57 is formed on a position that overlaps with a region where the first-stage stationary vane 47 is formed, in the axial direction of the rotor 12. Further, steam that has flowed into the final-stage annular space 57 through the final-stage through hole 50 is discharged to an exhaust chamber 100 via an outer through hole 59.

Condensation of liquid drops may occur not only on the surface of the first-stage stationary vane 42, but also on the surface of the inner wall portion 22 of the casing 20. When liquid drops condensate on the surface of the inner wall portion 22 of the casing 20, the liquid drops may scatter downstream, and cause moisture loss and erosion described above. Thus, according to this embodiment, by introducing steam after flowing through the first-stage through hole 50 into the first-stage annular space 57 to heat the inner wall portion 22, it is possible to suppress the amount of liquid drops that condensate on the surface of the inner wall portion 22.

Figure 14:
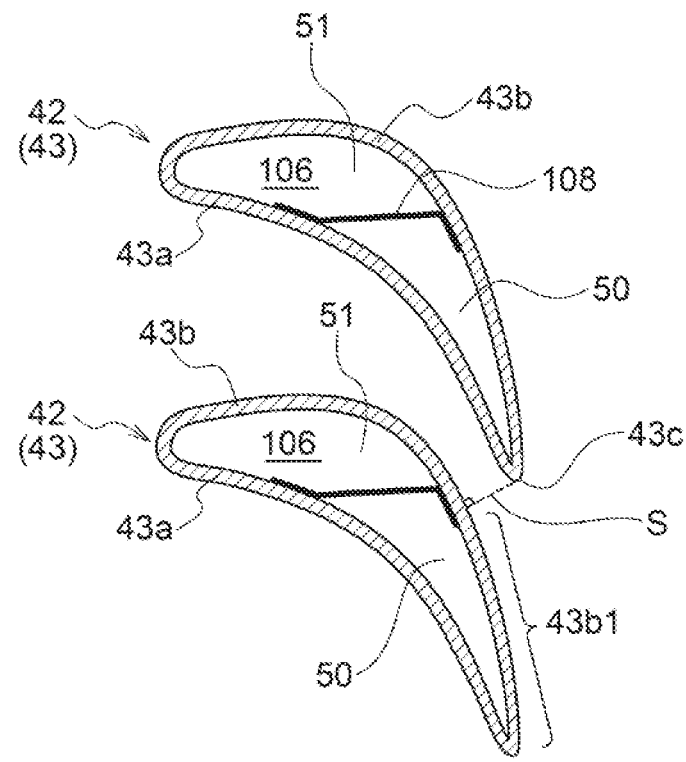
FIG. 14 is a cross-sectional view of the first-stage stationary vanes of a steam turbine according to an embodiment of the present invention.

FIG. 14 is a cross-sectional view of the first-stage stationary vane of a steam turbine according to an embodiment of the present invention.

In some embodiments, as depicted in FIG. 14, the above described first-stage stationary vane 42 is formed to have a hollow shape in cross section, including a pressure side portion 43a having a plate shape and a suction side portion 43b having a plate shape and defining a cavity portion 106 with the pressure side portion 43a.

According to this embodiment, the above described first-stage stationary vane 42 (stationary vane body portion 43 in FIGS. 2 to 9) is a so-called sheet metal stationary vane, including a pressure side portion 43a having a plate shape and a suction side portion 43b having a plate shape and defining a cavity portion with the pressure side portion. Such a sheet metal stationary vane has a smaller heat capacity than a typical casted stationary vane. Thus, by allowing steam to flow through the first-stage through hole 50, it is possible to obtain a high effect to heat the first-stage stationary vane 42.

In some embodiments, as depicted in FIG. 14, the above described first-stage stationary vane 42 includes a division plate 108 that divides into the first-stage through hole 50 and a space 51 other than the first-stage through hole 50. Further, of the suction side portion 43b of the first-stage stationary vane 42 described above, when the downstream side of the position of the throat S is defined as a super-cooled suction side surface 43b1, the first-stage through hole 50 is formed to face the super-cooled suction side portion 43b1 inside the first-stage stationary vane 42.

Herein, the throat S refers to a portion where the distance is minimum between a pair of first-stage stationary vanes 42, 42 that are adjacent to each other in the circumferential direction, and is a position where a line perpendicular to the suction side portion 43b of one of the first-stage stationary vanes 42 passes through the trailing edge 43c of the other one of the first-stage stationary vanes 42.

Furthermore, the first-stage through hole 50 may face the entire length of the super-cooled suction side portion 43b1, or at least a part of the entire length of the super-cooled suction side portion 43b1.

The present inventors conducted intensive researches and found that main steam passing through the final-stage stationary vanes 42, 42 that are adjacent to each other in the circumferential direction expands at the downstream of the position of the throat S, and the thereby the temperature decreases. That is, of the first-stage stationary vane 42, liquid drops condensate the most at the downstream side of the position of the throat S, of the suction side portion 43b of the first-stage stationary vane 32a. Thus, according to this embodiment, by forming the first-stage through hole 50 so as to face the super-cooled suction side portion 43b1 where liquid drops condensate the most, it is possible to suppress the amount of liquid drops that condensate on the surface of the first-stage stationary vane 42 effectively.

The embodiments of the present invention have been described above. However, the present invention is not limited thereto, and various modifications may be applied as long as they do not depart from the object of the present invention.

DESCRIPTION OF REFERENCE NUMERALS

1 Steam turbine plant
2 Boiler
3 Steam turbine device
4 Generator
5 Condenser
6 Water supply pump
7a Steam supply pipe
7b Condensate-water supply pipe
7c Boiler-water supply pipe
10 Steam turbine
12 Rotor
14A, 14B Rotor disc portion
14a, 15b Sealing surface
16, 18 Bottom portion
18P Farthest back portion
20 Casing
22 Inner wall portion
24 Outer wall portion
30A to 30E Stage
32a to 32e Stationary vane
34a to 34e Rotor blade
40 First stage
42 Final-stage stationary vane
43, 63, 93 Stationary vane body portion
44 First-stage rotor blade
45, 65, 95 Partition plate
45a, 65a, 95a Outer peripheral surface
46 First cavity
47 First seal portion
47A Upstream seal portion
47B Bottom-side seal portion
48 Second seal portion
48A Downstream seal portion
50 First-stage through hole
50a Inlet opening
50b Outlet opening
51 Space other than the first-stage through hole
52 Wall-portion side through hole
54 Second-stage through hole
54a Inlet opening
54b Outlet opening
56 Connection passage
56A Connection pipe passage
56B Through hole
57 First-stage annular space
58 Second wall-portion side though hole
59, 99 Outer through hole
60 Second stage
62 Second-stage stationary vane
64 Second-stage rotor blade
66 Second cavity
70 Inner space
80 Outer space
86 Final-stage cavity
90 Final-stage through bole
93s Slit
94 Droplet-removing flow passage
96, 106 Cavity portion
97 Final-stage annular space
98, 108 Division plate
100 Exhaust chamber

The invention claimed is:

1. A steam turbine, comprising:
a rotor configured to rotate about an axis;
a casing which houses the rotor; and
a first stage including a first-stage stationary vane fixed to an inner wall portion of the casing and a first-stage rotor blade fixed to the rotor at downstream of the first-stage stationary vane,
wherein the rotor includes a first cavity having a concave shape and being formed on a portion facing the first-stage stationary vane, the first cavity being in communication with an inner space defined between the inner wall portion and the rotor at upstream of the first-stage stationary vane,
wherein the first-stage stationary vane includes a first-stage through hole which is in communication with the first cavity and which is formed through the first-stage stationary vane in a radial direction, and
wherein the steam turbine is configured such that steam introduced from the first cavity via an inlet opening of the first-stage through hole flows through the first-stage through hole.

2. The steam turbine according to claim 1, wherein the first stage is positioned upstream of a final stage of the steam turbine.

3. The steam turbine according to claim 1, wherein the first stage is positioned in a wet region which is a region downstream of a change position where main steam flowing through the inner space changes from dry steam to wet steam, the first stage being a most upstream stage in the wet region in a case where a plurality of stages are disposed in the wet region.

4. The steam turbine according to claim 1,
wherein the first-stage stationary vane includes a stationary-vane body portion extending from the inner wall portion toward the rotor, and a partition plate having an annular shape and being disposed on a tip portion of the stationary-vane body portion, and
wherein the inlet opening is formed on the partition plate.

5. The steam turbine according to claim 4,
wherein the partition plate includes a first seal portion configured to seal a gap between the partition plate and the rotor, and
wherein the inlet opening is formed downstream of the first seal portion, or on a position overlapping with a region where the first seal portion is formed in an axial direction of the rotor.

6. The steam turbine according to claim 5,
wherein the partition plate further includes a second seal portion configured to seal a gap between the partition plate and the rotor, at downstream of the first seal portion, and
wherein the inlet opening is formed upstream of the second seal portion, or on a position overlapping with a region where the second seal portion is formed in an axial direction of the rotor.

7. The steam turbine according to claim 1,
wherein the casing further includes an outer wall portion defining an outer space formed on a radially outer side of the inner space, between the outer wall portion and the inner wall portion,
wherein the outer space is formed on a position overlapping with a region where the first-stage stationary vane is formed in an axial direction of the rotor, the outer space being in communication with the inner space at downstream of the first-stage stationary vane, and wherein the steam turbine is configured such that steam after flowing through the first-stage through hole is discharged to the outer space from an outlet opening of the first-stage through hole.

8. The steam turbine according to claim 1,
wherein the steam turbine further includes a second stage including a second-stage stationary vane fixed to the inner wall portion and a second-stage rotor blade fixed to the rotor at downstream of the second-stage stationary vane, the second stage being positioned downstream of the first stage,
wherein the rotor includes a second cavity having a concave shape and being formed on a portion facing the second-stage stationary vane, the second cavity being in communication with the inner space at upstream of the second-stage stationary vane,
wherein the second-stage stationary vane has a second-stage through hole being in communication with the second cavity and being formed through the second-stage stationary vane in the radial direction,
wherein the steam turbine further includes a connection passage connecting the first-stage through hole and the second-stage through hole, and
wherein the steam turbine is configured such that the steam after flowing through the first-stage through hole is discharged to the second cavity from an outlet opening of the second-stage through hole via the connection passage and the second-stage through hole.

9. The steam turbine according to claim 8,
wherein the first stage and the second stage are continuous stages.

10. The steam turbine according to claim 8,
wherein, when A1 is an area of an inlet opening of the first-stage through hole, A2 is a flow-passage area of the connection passage, and A3 is an area of the outlet opening of the second-stage through hole, expressions A3>A1 and A3>A2 are satisfied.

11. The steam turbine according to claim 8,
wherein the outlet opening of the second-stage through hole has an opening toward a farthest back portion of a bottom portion of the second cavity, in a cross-sectional view taken along an axial direction of the rotor.

12. The steam turbine according to claim 8,
wherein the outlet opening of the second-stage through hole has an opening toward a downstream side in a rotational direction of the rotor.

13. The steam turbine according to claim 1,
wherein the first stage is positioned upstream of a final stage of the steam turbine,
wherein the final stage includes a final-stage stationary vane fixed to the inner wall portion and a final-stage rotor blade fixed to the rotor at downstream of the final-stage stationary vane, wherein the rotor includes a final-stage cavity having a concave shape and being formed on a portion facing the final-stage stationary vane, the final-stage cavity being in communication with the inner space at upstream of the final-stage stationary vane,
wherein the final-stage stationary vane includes a final-stage through hole which is in communication with the final-stage cavity and which is formed through the final-stage stationary vane in the radial direction, and
wherein the steam turbine is configured such that steam introduced from an inlet opening of the final-stage cavity flows through the final-stage through hole.

14. The steam turbine according to claim 13,
wherein the final-stage stationary vane is formed to have a hollow shape in cross section, including a pressure side portion having a plate shape and a suction side portion having a plate shape and defining a cavity portion between the pressure side portion and the suction side portion,
wherein the pressure side portion of the final-stage stationary vane has a slit being in communication with the cavity portion, and
wherein the final-stage stationary vane includes a division plate dividing the cavity portion into a droplet-removing flow passage being in communication with the slit and the final-stage through hole.

15. The steam turbine according to claim 14,
wherein, when defining a super-cooled suction side portion as a downstream side of a throat position, of the suction side portion of the final-stage stationary vane, the final-stage through hole is formed so as to face the super-cooled suction side portion inside the final-stage stationary vane.

16. The steam turbine according to claim 1,
wherein a first-stage annular space having an annular shape and being in communication with the first-stage through hole is formed inside the inner wall portion supporting the first-stage stationary vane.

17. The steam turbine according to claim 1,
wherein the first-stage stationary vane is formed to have a hollow shape in cross section, including a pressure side portion having a plate shape and a suction side portion having a plate shape and defining a cavity portion between the pressure side portion and the suction side portion.

18. The steam turbine according to claim 17,
wherein the first-stage stationary vane includes a division plate dividing the cavity portion into the first-stage through hole and a space other than the first-stage through hole, and
wherein, when defining a super-cooled suction side portion as a downstream side of a throat position, of the suction side portion of the first-stage stationary vane, the first-stage through hole is formed so as to face the super-cooled suction side portion inside the first-stage stationary vane.

\* \* \* \* \*